(12) United States Patent
Fritts

(10) Patent No.: US 8,307,847 B2
(45) Date of Patent: *Nov. 13, 2012

(54) EJECTOR VALVE WITH GLANDS

(75) Inventor: Donald Keith Fritts, Broken Arrow, OK (US)

(73) Assignee: Enviro Valve, Inc., Calgary, Alberta (CA)

( * ) Notice: Subject to any disclaimer, the term of this patent is extended or adjusted under 35 U.S.C. 154(b) by 328 days.

This patent is subject to a terminal disclaimer.

(21) Appl. No.: 12/754,988

(22) Filed: Apr. 6, 2010

(65) Prior Publication Data

US 2011/0240133 A1 Oct. 6, 2011

Related U.S. Application Data

(63) Continuation-in-part of application No. 12/467,739, filed on May 18, 2009, now Pat. No. 8,016,263, which is a continuation-in-part of application No. 11/588,040, filed on Oct. 26, 2006, now abandoned.

(51) Int. Cl.
*F16K 15/00* (2006.01)

(52) U.S. Cl. .................... 137/528; 137/464; 137/467

(58) Field of Classification Search .................. 251/325; 137/456, 464, 465, 467, 528
See application file for complete search history.

(56) References Cited

U.S. PATENT DOCUMENTS

| | | | |
|---|---|---|---|
| 2,401,397 A | 6/1946 | Wright | |
| 3,141,470 A | 7/1964 | La Fontaine | |
| 3,202,177 A | 8/1965 | Klein et al. | |
| 3,234,959 A | 2/1966 | Feinberg | |
| 3,474,809 A | 10/1969 | Gordon | |
| 3,494,370 A | 2/1970 | Wahl et al. | |
| 3,529,624 A | 9/1970 | Cryder et al. | |
| 3,548,848 A | 12/1970 | Stichling | |
| 3,847,412 A | 11/1974 | Mattison | |
| 4,003,395 A | 1/1977 | Tyler | |
| 4,248,257 A | 2/1981 | Hardesty | |
| 4,579,136 A | 4/1986 | Oman et al. | |
| 4,673,162 A | 6/1987 | Lachmann | |
| 4,846,810 A | 7/1989 | Gerber | |
| 4,859,155 A | 8/1989 | Laqua | |
| 6,058,961 A | 5/2000 | Taylor | |
| 6,209,561 B1 | 4/2001 | Kugelev et al. | |
| 6,276,125 B1 | 8/2001 | Tseng | |
| 6,622,752 B2 | 9/2003 | Kushida et al. | |
| 6,637,448 B2 | 10/2003 | Naab et al. | |
| 6,651,686 B2 | 11/2003 | Scantlin et al. | |
| 6,651,696 B2 | 11/2003 | Hope et al. | |
| 6,820,652 B2 | 11/2004 | Gaydos et al. | |
| 6,851,445 B2 | 2/2005 | Girouard | |

(Continued)

*Primary Examiner* — John K Fristoe, Jr.
*Assistant Examiner* — Reinaldo Sanchez-Medina
(74) *Attorney, Agent, or Firm* — Molly D. McKay

(57) ABSTRACT

A fast opening pressure relief valve (200) for providing pressure relief for a vessel. The valve (200) has an ejector (216) and a sleeve structure (210) in which the ejector (216) moves longitudinally. The ejector (216) is constructed of material that will expand outward slightly upon pressurization, increasing friction between staging glands (202) provided on the sleeve structure (210) and buckling glands (206) provided on the ejector (216). Also, as pressure on the ejector (216) increases, the buckling rings (206) deform slightly to release their grip on the staging glands (202) and move past them. Once the buckling rings (206) move past the staging glands (202), the pressurized ejector (216) quickly moves to its open position, i.e. opening within 2 and 3 milliseconds, thereby releasing the pressure on the vessel. The valve (200) can be reset by returning the ejector to its closed position.

6 Claims, 18 Drawing Sheets

U.S. PATENT DOCUMENTS

| | | |
|---|---|---|
| 6,877,525 B2 | 4/2005 | Fischer et al. |
| 6,915,813 B2 | 7/2005 | Kobes |
| 6,918,407 B2 | 7/2005 | White et al. |
| 6,918,409 B1 | 7/2005 | Parker |
| 6,935,616 B2 | 8/2005 | Baumann |
| 6,978,799 B2 | 12/2005 | Kugelev et al. |
| 6,994,101 B2 | 2/2006 | Freiler |
| 7,007,715 B2 | 3/2006 | Nakayama et al. |
| 7,033,387 B2 | 4/2006 | Zadno-Azizi et al. |
| 8,016,263 B2 * | 9/2011 | Fritts .................. 251/175 |
| 2006/0213564 A1 | 9/2006 | Ricci et al. |

\* cited by examiner

EJECTOR VALVE WITH GLANDS

CROSS-REFERENCE TO RELATED APPLICATIONS

The present application is a Continuation in Part of U.S. patent application Ser. No. 12/467,739 filed on May 18, 2009 now U.S. Pat. No. 8,016,263 for the invention entitled Ejector Valve Machine which in turn is a Continuation in Part of U.S. patent application Ser. No. 11/588,040 filed on Oct. 26, 2006 now abandoned for the invention entitled Ejector Valve Machine.

BACKGROUND OF THE INVENTION

1. Field of the Invention

This invention relates generally to the field of pressure relief and more specifically to a machine with an ejector for affecting pressure relief. The machine is an ejector valve with glands that buckle to allow the release of pressure from a vessel or enclosure.

2. Description of the Related Art

A requirement for pressure relief began when the first vessel was heated to develop steam. This dates back at least to the time of the ancient Greek scientist Hero of Alexandria who experimented with jet propelled rotary steam engines in the first century A.D., whereby it was established that heating a fluid in a closed container will cause increased pressure within the container. If the pressure exceeds the strength of the container, the container will explode with obvious undesirable consequences. Means to dissipate excess pressure, therefore, have long been devised and are well known. But, heretofore, numerous disadvantageous characteristics have been inherent in known pressure release means.

For example, those means that are cheap and uncomplicated tend not to be capable of dealing with extremely high pressures. Also, many designs require complicated structures with parts precisely cast or machined so that they are extremely difficult and expensive to make. Some such intricate constructions will foul easily should bits of solid material flow through them.

Numerous designs require fusible or frangible elements which necessitate the replacement of the entire valve or the disassembly and reassembly of the valve after activation, during which time the process or system being regulated must be shut down for extended periods. Other designs require elements such as, but not limited to, explosives, motors, solenoids, or pressurized gas, which are independent of the medium being regulated, to activate the valve.

Sundry designs also require complex pressure sensing means communicating with servo mechanisms to activate valves. Furthermore, because of characteristics inherent in known designs, the stated set pressure frequently varies from the actual set pressure by significant amounts. Obviously, if the actual set pressure is higher than the stated set pressure, a given valve might not activate at a pressure low enough to prevent damage to a system or process, while if the actual set pressure is too low, a process or system may be interrupted unnecessarily.

In addition, many designs require dampening means to prevent flutter.

The instant disclosure overcomes these disadvantages thusly advancing the art of pressure relief.

U.S. Pat. No. 7,007,715 B2 by Nakayama et al. discloses a pressure relief valve having a shaft part mounted coaxially within an outlet conduit and a valve element of flexible material having a seal lip contacting the exterior of the shaft part and a base portion contacting the interior of the outlet conduit. In addition, Nakayama et al. teach an extension spring disposed circumferentially about a portion of the valve element so as to press the seal lip against the exterior of the shaft part and teaches against travel of the valve element within the outlet conduit. This, in combination with the base portion's being in contact with the interior of the outlet conduit, blocks flow through the outlet conduit.

Other embodiments taught by Nakayama et al. are effectively turned inside out. The valve body is disposed so that one portion is supported by the shaft part. Another portion comprises a cap over the end of the outlet conduit. Part comprising a seal lip is held by an extension spring to the exterior of the outlet conduit. In all embodiments of Nakayama et al., the valve is opened when pressure within the outlet conduit is great enough to overcome the extension spring so that the seal lip may be forced away from the outlet conduit or the shaft part thusly releasing said pressure.

In contrast to Nakayama et al., the instant art teaches no spring that must be overcome in order for a valve to open. In additional contrast to Nakayama et al., the instant art teaches away from deforming a part of a valve element in order that pressure be allowed to escape between the valve element and the interior or exterior of an outlet. The instant art, instead, teaches deforming a valve element to an extent that it prevents the medium being regulated from leaking out between the valve element and the containing or supporting structure. In yet further contrast to Nakayama et al., the instant art teaches movement of a valve element within a bore with pressure release accomplished by alignment of openings in the valve element and the outlet conduit or exposure of said openings directly to the atmosphere, the area of said openings not limited to area less than the cross sectional area of the outlet conduit.

Furthermore, one may note that the volume of medium that may be released through the outlet conduit taught by Nakayama is limited by the shaft part and/or the shaft part with valve body affixed which substantially occludes the cross section of the outlet conduit. In contrast, the instant art, by accomplishing pressure release by means of the previously described alignment of holes or direct exposure to the atmosphere, allows, via nozzle effect, for an increased discharge through the same diameter outlet conduit. This is a significant advantage over Nakayama et al.

U.S. Pat. No. 6,820,652 by Gaydos et al. discloses a valve comprising a valve seat having inlet ports and outlet ports with a valve seal covering the ends of the inlet ports and exit ports and a housing to secure the valve seal to the valve seat such that there is clearance between the valve seal and the housing. The valve seal is elastomeric so that when pressure entering the inlet port is great enough, the seal will distend and uncover the ends of the inlet ports and outlet ports allowing pressurized medium to flow through the clearance between the valve seal and the housing and out.

In contrast to Gaydos et al., the instant art teaches embodiments comprising no valve seat. In additional contrast to Gaydos et al., the instant art teaches away from flow between a valve element and a housing. Instead, it teaches pressure relief by means of the movement within a bored structure of a valve element which aligns holes in the valve element with holes in the bored structure or exposes holes directly to the atmosphere. In further contrast to Gaydos et al., the instant art does not require that the inlet and exit ports have portions with diameters less than the housing. Thus, instant art of the same diameter as Gaydos et al. may affect the passage of much greater volume of medium and thus accomplish more rapid release of pressure, an advantage over Gaydos et al.

U.S. Pat. No. 4,846,810 by Gerber discloses a valve having a body covered by an elastomeric sheath which blocks inlet and outlet passages through the valve body. When pressure within the inlet ports is sufficient, the elastomeric sheath is forced away from the valve body so that medium may pass between the elastomeric sheath and the valve body via the inlet and outlet passages.

In contrast to Gerber, the instant art comprises no elastomeric sheath and teaches away from the passage of medium between a valve body and an outside surface. In additional contrast to the instant art, the cross sectional area of the outlet of Gerber must be substantially less than the cross sectional area of the valve body so that the maximum flow released by Gerber must be less than that of the instant art for a given valve body size, an advantage over Gerber.

U.S. Pat. No. 3,474,809 by Gordon discloses a valve having an element in the form of a flap held in place by frangible connection with an element. In addition, Gordon discloses a piston, powered by an explosive charge which, upon activation, breaks the frangible connections so that the valve may open. Gordon teaches activation by electrical signal triggered by a pressure sensing device and teaches away from operation of the valve by means of pressure within a valve assembly.

In contrast to Gordon, the instant art does not teach or require a flap type valve element, nor does it teach or require any frangible connection or explosive. The instant art teaches activation of the valve by action of pressure, within a valve assembly, of the medium being regulated, this also being contrary to Gordon.

U.S. Pat. No. 6,058,961 by Taylor discloses a piston valve having a valve seat and a pressure sensing means separate from the piston but communicating with the piston. In addition, Taylor teaches that the piston is of always equal slidable fit within a bore regardless of the pressure of the medium being regulated.

In contrast to Taylor, the instant art teaches no valve seat or any pressure sensing means separate from a valve element. In additional contrast to Taylor, the instant art comprises a valve element wherein the slidable fit varies in response to various levels of pressure.

U.S. Pat. No. 3,494,370 by Wahl et al. discloses a valve having an element held in closed position by frangible elements and opened by force of an explosive powered ram which breaks the frangible elements and forces the valve element to open position.

In contrast to Wahl et al., the instant art neither teaches nor requires any frangible element or ram. In additional contrast to Wahl et al, the instant art neither teaches nor requires explosive or any source of energy separate from the medium being regulated.

U.S. Pat. No. 6,851,445 B2 by Girouard discloses a pressure relief device having an inlet and an outlet, the inlet portion having a diameter greater than the outlet portion. Girouard further discloses a plug located in a bore between the inlet and outlet and a bonding material to hold the plug in a position until a pre-determined temperature is reached. In addition, Girourard requires the bore and the plug to have tapered portions.

In contrast to Girouard, the instant art neither teaches nor requires an inlet with a diameter different than the diameter of the outlet. In additional contrast to Girouard, the instant art teaches embodiments requiring neither a bore nor a plug having tapered portions. In further contrast to Girouard, the instant art neither teaches nor requires a temperature sensitive bonding material to hold any element in place.

U.S. Pat. No. 6,994,101 B2 by Freiler discloses a pressure relief valve comprising a fusible element and heat conducting elements to conduct heat from a medium in a vessel to the fusible element which melts and releases pressure at a pre-determined temperature.

In contrast to Freiler, the instant art neither teaches nor requires any fusible element nor any heat conducting elements. In additional contrast to Freiler, the instant art is not dependent upon temperature of any medium for activation.

U.S. Pat. No. 7,033,387 by Zadno-Azizi et al. discloses a structure to hold a valve element held in place in a conduit by friction. In addition, Zadno-Azizi et al. teaches a stationary flow control mechanism independent of but, communicating with, the friction causing structure and a valve element.

In contrast to Zadno-Azizi et al., the instant art neither teaches nor requires a flow control mechanism operating independently of the friction causing mechanism but to the contrary teaches that the aforesaid are one in the same. In additional contrast to Zadno-Azizi et al., the instant art teaches flow control by movement of a valve element within a conduit.

U.S. Pat. Nos. 6,978,799 B2 and 6,209,561 B1 by Kugelev et al. disclose pressure relief valves, each having a piston valve element within a bore which defines an upper chamber and a lower chamber. The upper chamber communicates with a pressurized fluid other than the fluid being regulated. This biases the piston valve element in closed position. When the pressure in the lower chamber reaches a pre-determined level, the piston valve element is forced into open position and the pressurized fluid in the upper chamber is transferred to the lower chamber to delay return of the piston valve element to closed position.

In contrast to Kugelev et al., the instant art neither teaches nor requires the action of any media other than the one being regulated and neither teaches nor requires transfer of any media from one chamber to another to delay return of a valve element to closed position. In additional contrast to Kugelev et al., the instant art teaches embodiments having no biasing means.

U.S. Pat. No. 6,935,616 B2 by Baumann teaches a plug valve wherein the plug has stepped diameters and wherein the plug is slidable within a bore having stepped diameters with said stepped diameters comprising valve faces on the plug and valve seats in the bore. In addition, Baumann teaches and requires means to equalize pressure on both sides of the plug and teaches slanted inlet and outlet passages. Also, Baumann teaches an actuating device independent of whatever media the valve may regulate and a bonnet.

In contrast to Baumann, the instant art teaches embodiments having no stepped diameters of any elements and teaches embodiments without valve seats. In additional contrast to Baumann, the instant art neither teaches nor requires equalized pressure on both sides of any valve element but teaches unequal pressure on opposing sides of the valve elements. In further contrast to Baumann, the instant art requires no activating agency other than that of whatever media may be regulated and does not require slanted inlet or outlet ports and teaches embodiments having no bonnet.

U.S. Pat. No. 4,673,162 by Lachmann discloses a flow control valve having a valve chamber and a control chamber with a valve body disposed there between and having a valve face exposed at the inlet of the valve, said valve body further comprising a control body disposed in the control chamber and having a control face and a counter pressure face with the counter pressure face having a surface area larger than that of the valve face. The control body divides the control chamber into a control compartment at the control face and counter pressure compartment at the counter pressure face. In addition, Lachmann teaches pressurization of the control chamber by means of communication with separate pressurized control medium at the inlet. Further, Lachmann discloses an electrically motivated valve activation device such as a solenoid.

In contrast to Lachmann, the instant art neither teaches nor requires communication in order to transfer pressure from one side of a valve element to another in order to affect movement of said valve element. In additional contrast, the instant art neither teaches nor requires electricity nor any force other than direct contact with the medium being regulated.

U.S. Pat. No. 6,918,409 B1 by Parker discloses a spool valve having increased clearance between the spool and the inside of a conduit, a spring, and an electrical and magnetic activating device.

In contrast to Parker, the instant art teaches away from clearance between a valve element and the conduit in which it is disposed, teaches embodiments having no spring, and neither teaches nor requires the agency of electricity and/or magnetism nor any other activating force other than that of the medium being regulated.

U.S. Pat. No. 6,918,407 B2 by White et al. discloses a valve assembly having a valve element with an upper end communicating with a pneumatic control chamber and a lower end communicating with a fluid. Also, disposed between the valve element upper end and the pneumatic control chamber is an upper chamber which communicates with the fluid. The pneumatic control chamber is pressurized preceding use and exerts a force on the valve element biasing it into closed position. When pressure of the fluid exceeds the pressure of the pneumatic control chamber, the valve is forced open.

In contrast to White et al., the instant art teaches embodiments having no biasing means and neither teaches nor requires communication between one side of a valve element and another. In additional contrast to White et al., the set point of the instant art may depend only upon the valve element itself and not on any complicated structure communicating with it.

U.S. Pat. No. 3,847,412 by Mattson discloses a ballistic missile traveling freely, substantially without any impediment, within a tube having apertures disposed radially and transversely. The missile is hollow and is propelled within the tube by release of pressurized gas aft of the missile. The missile has apertures radially disposed about its forward end so that the pressurized gas may be released when said apertures align with the holes in the steel tube. The missile allows gradual increase in the quantity of gas release upon initiation of gas inflow into the steel tube and allows for gas release immediately upon introduction into the steel tube.

In contrast to Mattson, the instant art teaches away from gradual increase in quantity released but rather teaches substantially instantaneous release of maximum quantity and pressure. In additional contrast to Mattson, the instant art teaches away from release of material upon initial exposure of a valve element to said material but rather teaches a substantial set pressure below which no material is released. In additional contrast to Mattson, the instant art teaches a valve element frictionally fixed within a conduit with free movement possible only above substantially high set pressure.

U.S. Pat. No. 4,248,257 by Hardesty teaches a valve having an element held in closed position by an explosive bolt. Upon pressure activation of the valve, an electrical pulse activates an explosive which breaks the bolt and the element is allowed to move into open position.

In contrast to Hardesty, the instant art neither teaches nor requires any breakable or disintegratable elements and neither teaches nor requires explosives or electricity.

U.S. Pat. Nos. 6,637,448 B2 by Naab et al.; 4,579,136 by Oman et al.; 4,003,395 by Tyler; and 3,548,848 by Stichling disclose valve assemblies having valve elements held in position by frangible elements which are released by forces generated either by explosions or discharge of high pressure gas which break the frangible elements and force the valve elements to move. In no case is the activating force derived from the medium being regulated by the valves. In addition, Stichling teaches a second explosive charge which will return the valve element to its original position after being displaced by a first explosive charge.

In contrast to the above, the instant art teaches no frangible elements which must be broken or any explosive charge or compressed gas charge or any activating agency independent from the medium being regulated.

U.S. Pat. No. 3,141,470 by La Fontaine teaches a valve having an element held in place by frangible connections. The valve element is moved by a piston powered by an explosive charge which causes the piston to break the frangible elements. In addition, La Fontaine discloses means to relieve pressure behind the piston after detonation of the explosive charge and means to prevent contact of the explosive gasses generated by explosion with the medium being regulated by the valve.

In contrast to La Fontaine, the instant art comprises no explosive charges, no piston which moves a valve element, no frangible elements, no pressure release means for gasses generated by an explosion, and no means to keep separate the explosive gasses and the medium being regulated. In further contrast to La Fontaine, the instant art neither teaches nor requires an activating agency using force separate from that of the medium being regulated.

U.S. Pat. No. 6,651,686 B2 by Scantlin et al. discloses an actuator system for a valve having a biasing element and a source of activating power separate from the medium being regulated by the valve. In addition, Scantlin et al. disclose a latch system which must be activated in order for the actuator to either open or close the valve.

In contrast to Scantlin et al., the instant art comprises no complicated separate activating device. In additional contrast to Scantlin, the instant art neither teaches nor requires any activating force derived from any source other than the medium being regulated, nor any latching mechanisms, and teaches embodiments having no biasing means.

U.S. Pat. No. 3,529,624 by Cryder et al. discloses a valve having a valve element with opposing portions comprising different surface areas, a dampening means, a biasing means, and a portion of the valve element which must communicate with a valve seat in order for the valve to close.

In contrast to Cryder et al., the instant art teaches embodiments having no biasing element. In additional contrast to Cryder et al., the instant art neither teaches nor requires dampening means nor opposing sides of a valve element having different surface areas. In additional contrast to Cryder, the instant art teaches embodiments having no valve seat.

U.S. Pat. No. 3,202,177 by Klein et al. discloses a pressure regulating valve having an element permanently slidable within a bore and having a biasing element.

In contrast to Klein et al., the instant art teaches embodiments having no biasing elements and teaches away from permanent slidability of an element within a housing, but teaches a valve element constrained by friction between the valve element and the housing.

U.S. Pat. No. 4,859,155 by Laqua discloses a displacement pump bypass valve having a spring which urges a piston against a valve seat. In addition, Laqua discloses an activation means having an expansion chamber, the volume of which is variable by means of a modulator disc in communication with a modulator spring.

In contrast to Laqua, the instant art teaches embodiments having no springs and embodiments having only one spring. In additional contrast to Laqua, the instant art neither teaches nor requires an expansion chamber nor any means to vary the volume thereof. In further contrast to Laqua, the instant art teaches embodiments having no valve seat or elements which must communicate with same.

U.S. Pat. No. 6,622,752 B2 by Kushida et al. discloses a pressure relief valve having an element which must communicate with a valve seat, a biasing element for the valve element, and a means to adjust the set point by deforming the valve housing by force from the outside which in turn changes the tension on the biasing element.

In contrast to Kushida et al., the instant art teaches embodiments having no biasing element, and neither teaches nor requires the deformation of a housing in order to vary the set point. In additional contrast to Kushida et al., the instant art teaches embodiments having no valve seat.

U.S. Pat. No. 6,651,696 B2 by Hope et al. teaches a pressure relief valve having a valve element slidable in a bore. In addition, the valve element is biased by at least one spring. Also, Hope et al. teaches a valve element having sealing assemblies biased against outlets. In addition, Hope et al. teach additional structures such as an internal passage and a valve element having stepped diameters. Further, Hope et al. teaches against friction between the valve element and the internal passage sufficient to prevent the movement of the valve element.

In contrast to Hope et al., the instant art teaches embodiments having no biasing element and teaches no embodiments having more than one biasing element. In additional contrast to Hope et al., the instant art teaches embodiments having no elements with stepped diameters and in all embodiments teaches friction between valve element and interior structure sufficient to prevent the valve element from moving. In further contrast to Hope et al., the instant art neither teaches nor requires any valve element having separate sealing assemblies.

U.S. Pat. No. 6,276,125 B1 by Tseng discloses a valve having a valve element which defines an upper chamber and a lower chamber with the valve element responsive to pressure in the upper chamber while subject to pressure in the lower chamber and upper chamber simultaneously. The area of the valve element surface defining the upper chamber must be different than the valve element surface defining the lower chamber. In addition, the valve element comprises a face which must communicate with a seat.

In contrast to Tseng, the instant art neither teaches nor requires a structure having two chambers wherein an activating force must communicate with opposite ends of a valve element either simultaneously or not simultaneously. In additional contrast to Tseng, the instant art does not depend upon a valve element having opposing structures with different surface areas. In yet further contrast to Tseng, the instant art teaches embodiments having no valve seat or corresponding communicating portion of a valve element.

SUMMARY OF THE INVENTION

The primary object of the invention is inexpensive and easy fabrication.

Another object of the invention is resetability without system or process shut down.

Another object of the invention is activation solely by medium being regulated.

A further object of the invention is provision of a valve that will not foul upon exposure to highly viscous media or media containing solids.

Yet another object of the invention is provision of a valve wherein the difference between stated set pressure and actual set pressure is within precise tolerances.

Still yet another object of the invention is embodiments that reset automatically.

Another object of the invention is quick opening when set pressure is reached.

Another object of the invention is elimination of dampening means.

Still another object of the invention is provision of a valve that will operate at either high or low pressures.

Yet another object of the invention is provision of a valve wherein the set, or activation, pressure may be varied.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for regulating pressure comprising: valve structure, ejector element, and outlet port.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
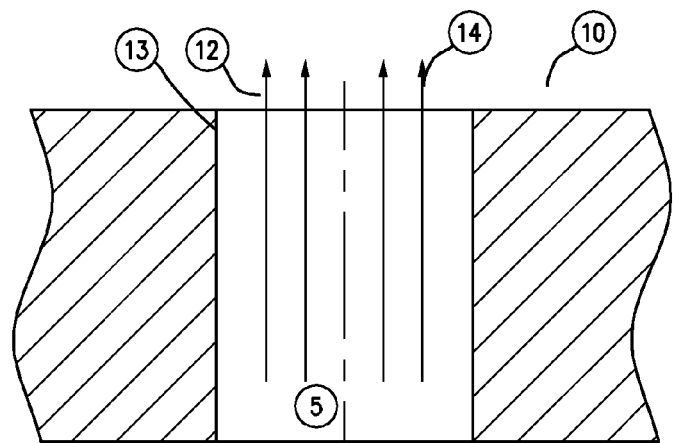
FIG. 1 is a perspective view of a valve structure.

Turning now to FIG. 1, we see a sleeve structure (10) which defines a passage (12) having a wall (13) through which any medium (14), here and hereafter represented by arrows, under pressure may flow.

Figure 2:
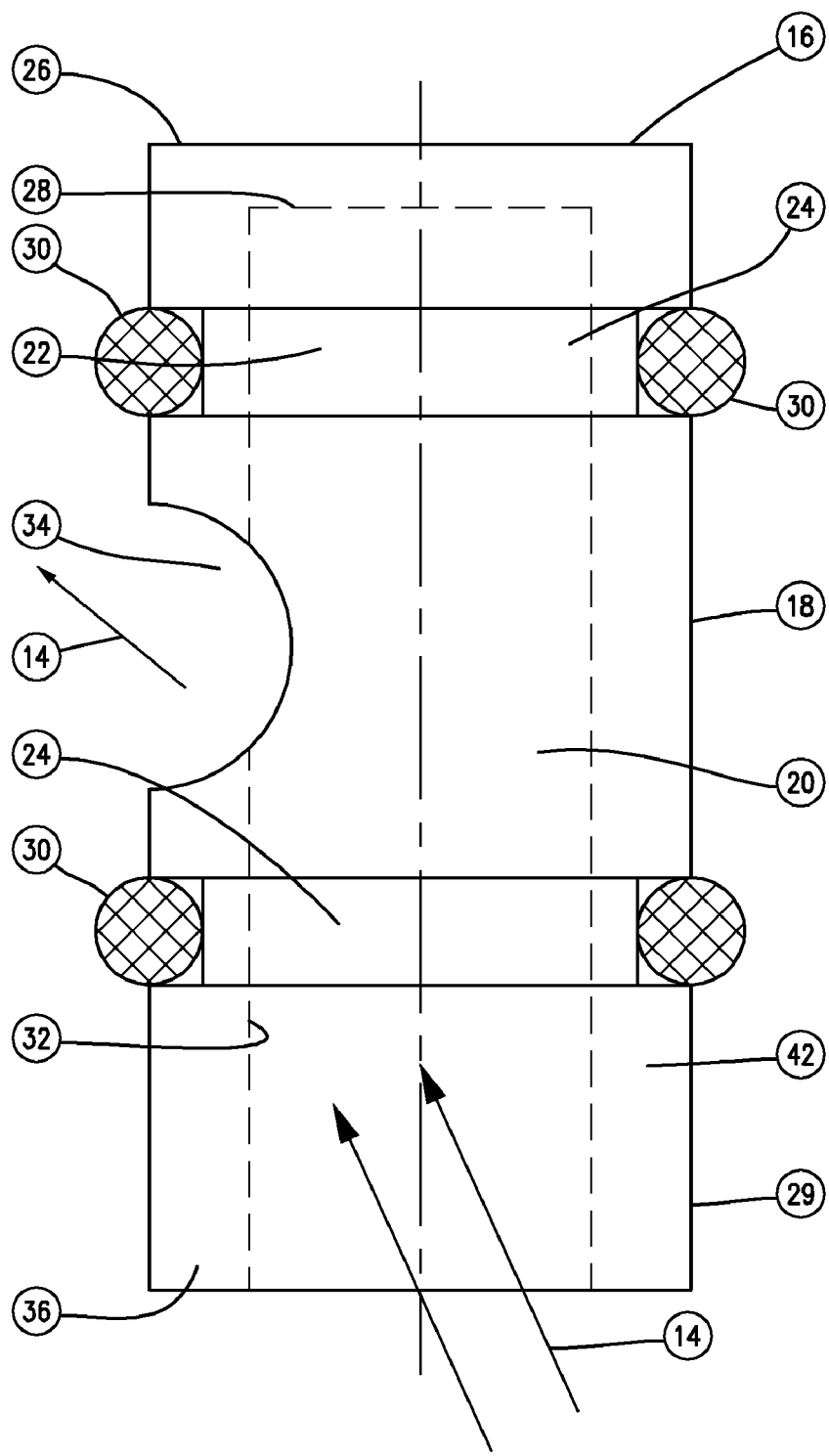
FIG. 2 is a perspective view of an ejector.

Looking now at FIG. 2, we see an ejector (16) having a body (18) and ejector walls (42), which define an interior space (20) and exterior surface (22).

Further, we see that the ejector body (18) has an external anterior end (26), an interior anterior end (28), a posterior end (29), and an interior side (32). In addition, we see annular grooves (24) disposed in the ejector body exterior surface (22) proximal both the exterior anterior end (26) and the posterior end (29). Disposed within the annular grooves (24), we see resilient O-rings (30). Further, we note that the posterior end (29) comprises an opening (36) into the ejector interior (20) and that the external anterior end (26) comprises no opening. Situated in the ejector body wall (42) we also note a discharge port (34) and we may readily appreciate that a medium (14) under pressure, may flow through the opening (36) into the ejector interior (20) and out through the outlet port (34). Furthermore, the ejector body (18) comprises a resilient material so that by action of the medium under pressure (14), the ejector body may be caused to expand.

Turning attention again to FIG. 1, we may readily appreciate that the sleeve structure (10) may comprise sundry configurations, including but not limited to, the wall of any internally pressurized vessel, structure or device to include pipes, tanks, bore-holes, or conduits, pumps, or compressors, for example. Furthermore, the sleeve structure (10) may comprise a separate housing or assembly that may communicate with any such pressurized vessel or structure, by any of sundry means well known in the art Turning attention now to FIG. 3 and FIG. 5, we see that the ejector (16) has a diameter and geometric configuration such that the ejector (16) may be inserted into the passage (12) of the sleeve structure (10) with minimum clearance (38) between the exterior surface (22) of the ejector (16) and the wall (13) of the sleeve structure (10) thusly comprising a valve assembly (40). In addition, we see that subsequent to such insertion, the O-rings (30) will affect a seal between the passage wall (13) and the ejector interior surface (32) after a fashion well known in the art. Thus, the medium under pressure (14) will be prevented from flowing all the way through the passage (12) by the ejector (16) in combination with the O-rings (30) which occlude the clearance (38) and block any medium (14), which may flow out the discharge port (34) into the clearance (38). Also, we note that the pressurized medium (14), will act simultaneously upon both the injector interior anterior end (28) and the interior side (32) of the ejector (16), such that sufficient pressure will overcome the friction between the O-rings (30) and the passage wall (13). At pressures slightly below that level, the ejector (16) will not move but such pressure may be high enough to cause the ejector (16) to expand, as a consequence of the resilient material comprising the ejector (16), to the point that the O-rings (30) are compressed and the ejector exterior surface (22) is forced against the passage wall (13) as in FIG. 5, increasing frictional resistance at the contact points.

Figure 3:
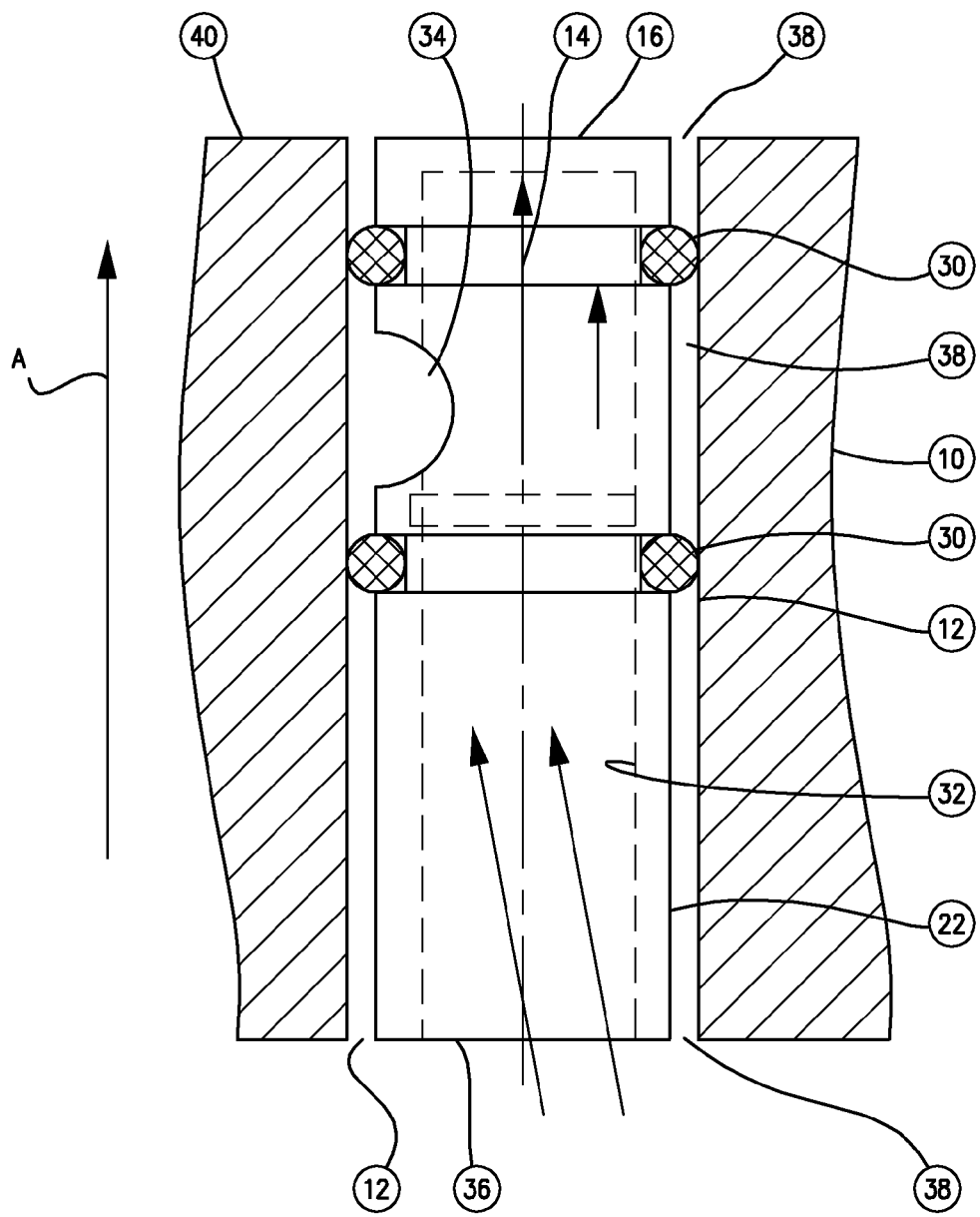
FIG. 3 is a perspective view of a valve assembly.
Figure 3A:
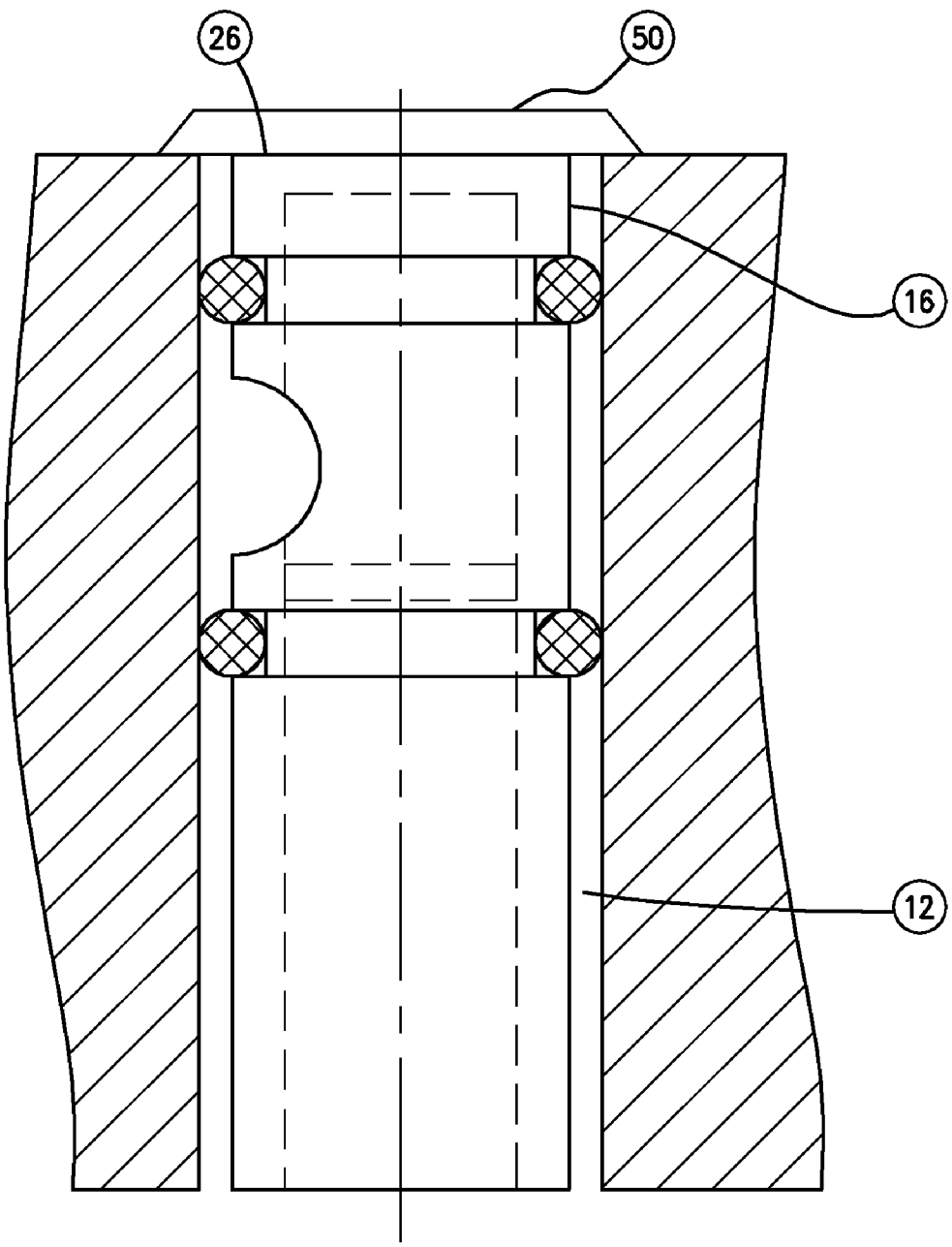
FIG. 3A is a perspective view of a valve assembly with top flange.

Looking now at FIG. 3A, we see that the anterior exterior end (26) of the ejector (16) may comprise a top flange (50) having a diameter greater than the diameter of the passage (12) so that the top flange (50) may be caused to abut the sleeve structure (10). Thusly, the distance the ejector (16) may be inserted into the passage (12) may be limited.

Figure 5:
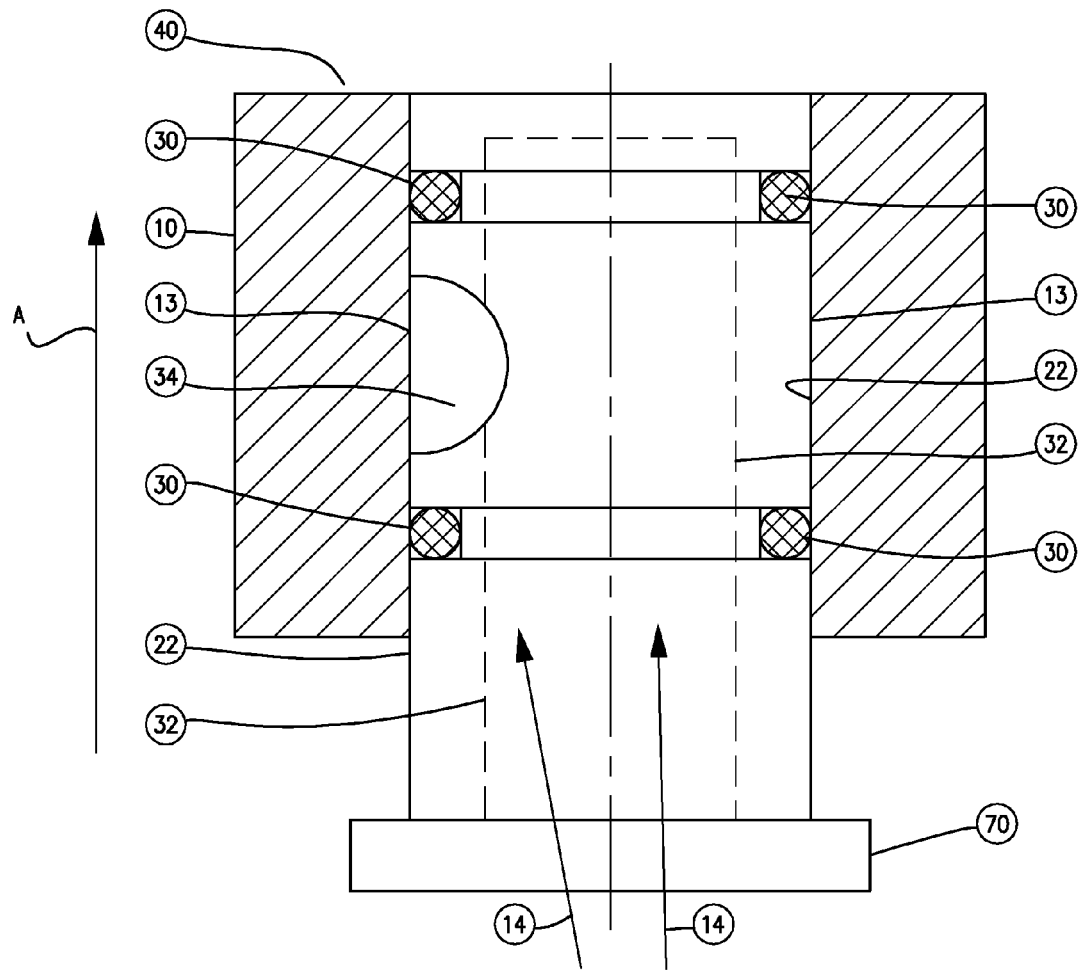
FIG. 5 is a perspective view of a valve assembly with bottom flange.

Now, considering again FIG. 3 and FIG. 5, we may readily appreciate that as the pressure of the medium (14) increases, said pressure, acting upon the interior side (32) of the ejector (16) will cause the ejector body (18) to expand which in turn causes the ejector body exterior (22) to compress the O-rings (30) and contact the passage wall (13) thusly eliminating the clearance (38) and thusly further occluding the outlet port (34) by the passage wall (13) as in FIG. 5. In addition, we may also readily appreciate that as this expansion occurs, friction between the ejector exterior (22) and the passage wall (13) will increase, and the force acting in direction A, indicated by arrow, on the interior anterior ejector end (28) will increase.

Also, those well versed in the art will readily appreciate that as pressure of the medium (14), is increased, the force on the interior anterior ejector end (28) will increase. Accordingly, friction between the ejector body exterior (22) and the passage wall (13) will increase. But the degree of increase in friction will diminish with each added increment of pressure.

Figure 4:
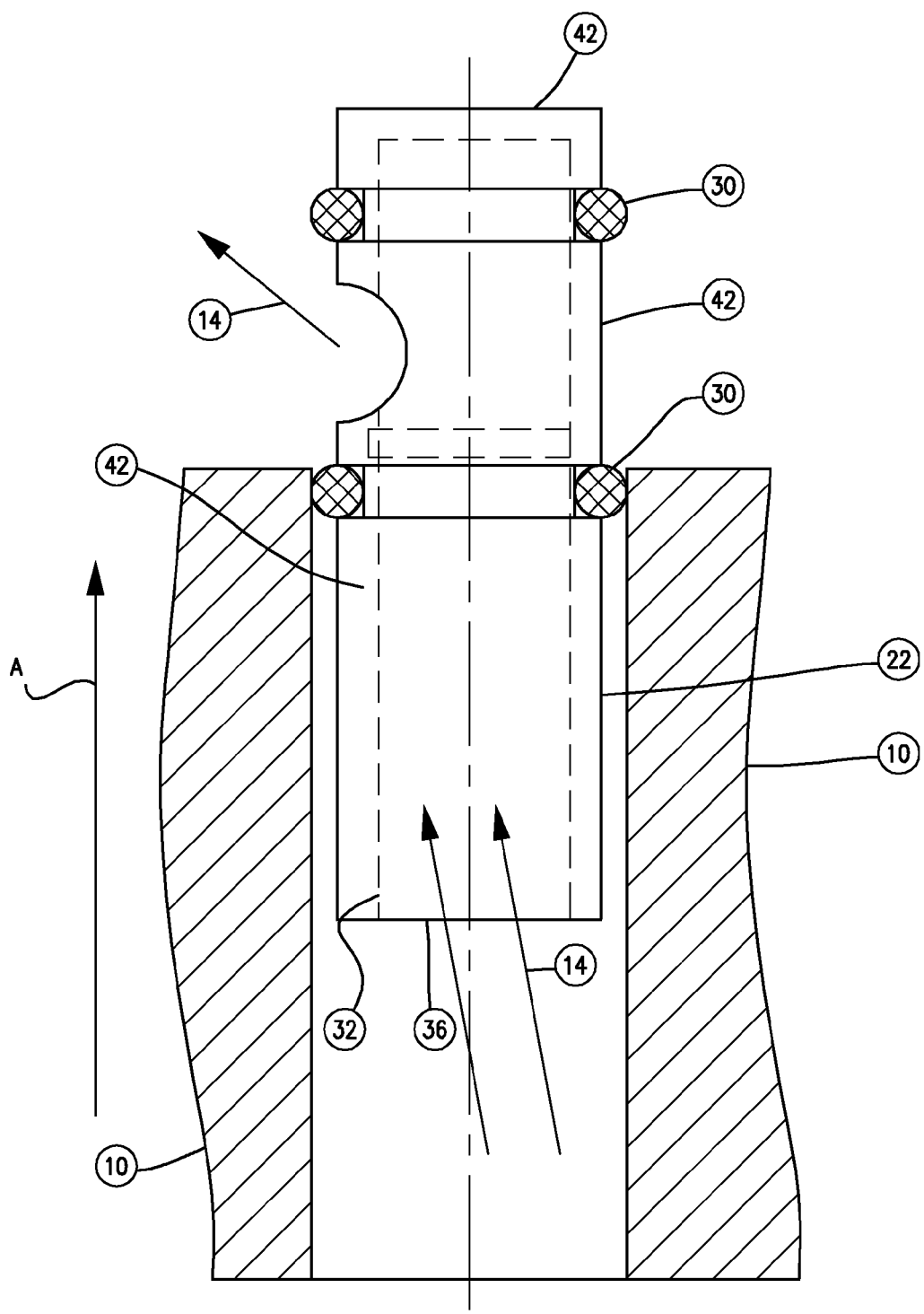
FIG. 4 is a perspective view of a valve assembly open.

Therefore, looking now at FIG. 4, we may understand that as pressure of the medium (14) increases, there will occur a pressure at which the force of the pressure acting upon the interior anterior end (28) of the ejector (16) will be greater than the force of the friction between the ejector body exterior (22) and the passage wall (13). At this point, the ejector (16) will be caused to move in direction A, indicated by arrow, whereupon the outlet port (34) will cease to be occluded by the passage wall (13) and/or the O-rings (30) and the medium (14), will then pass through the passage (12), into the interior of the ejector (20) through the opening (36), and out the outlet port (34). In addition, we may readily appreciate that after pressure acting on the interior side (32) of the ejector body (18) is thusly relieved, the injector body (18) will contract, whereupon friction between the exterior of the ejector (22) and the passage wall (13) will substantially diminish so that the ejector (16) may be manually pushed back into the passage (13) to reset the valve assembly (40) without dismantling the valve assembly, or replacing any element or shutting down any system or process.

Figure 1A:
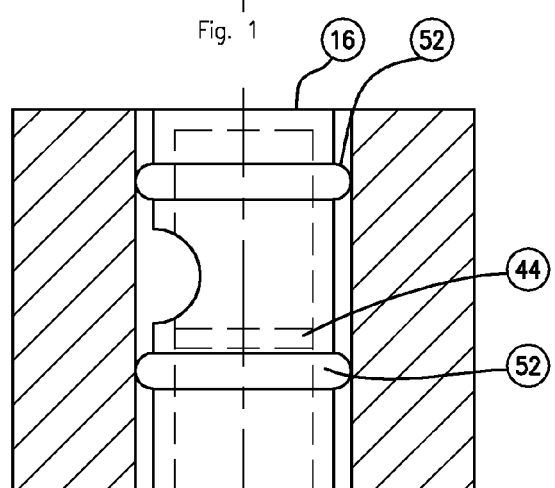
FIG. 1A is a perspective view of a valve assembly with annular rings.

Now, those skilled in the art will readily appreciate that the set pressure, that is the pressure at which the valve assembly (40) will open, is the pressure at which the friction between the passage wall (13) and the ejector exterior (22) is overcome. Furthermore, those skilled in the art will further recognize that the set pressure may be varied by sundry means. For example, the ejector body (18) and the sleeve structure (10) may comprise any number of different materials having different coefficients of friction and/or expansion. The ejector walls (42) may be of different thicknesses. The ejector walls (42) may comprise ejector grooves (44) or other indentations to change the surface area of the ejector exterior surface (22), as in FIG. 1A, that will contact the passage wall (13).

Figure 1B:
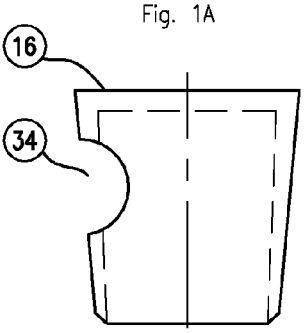
FIG. 1B is a perspective view of an ejector configured for press fit in a structure.
Figure 1D:
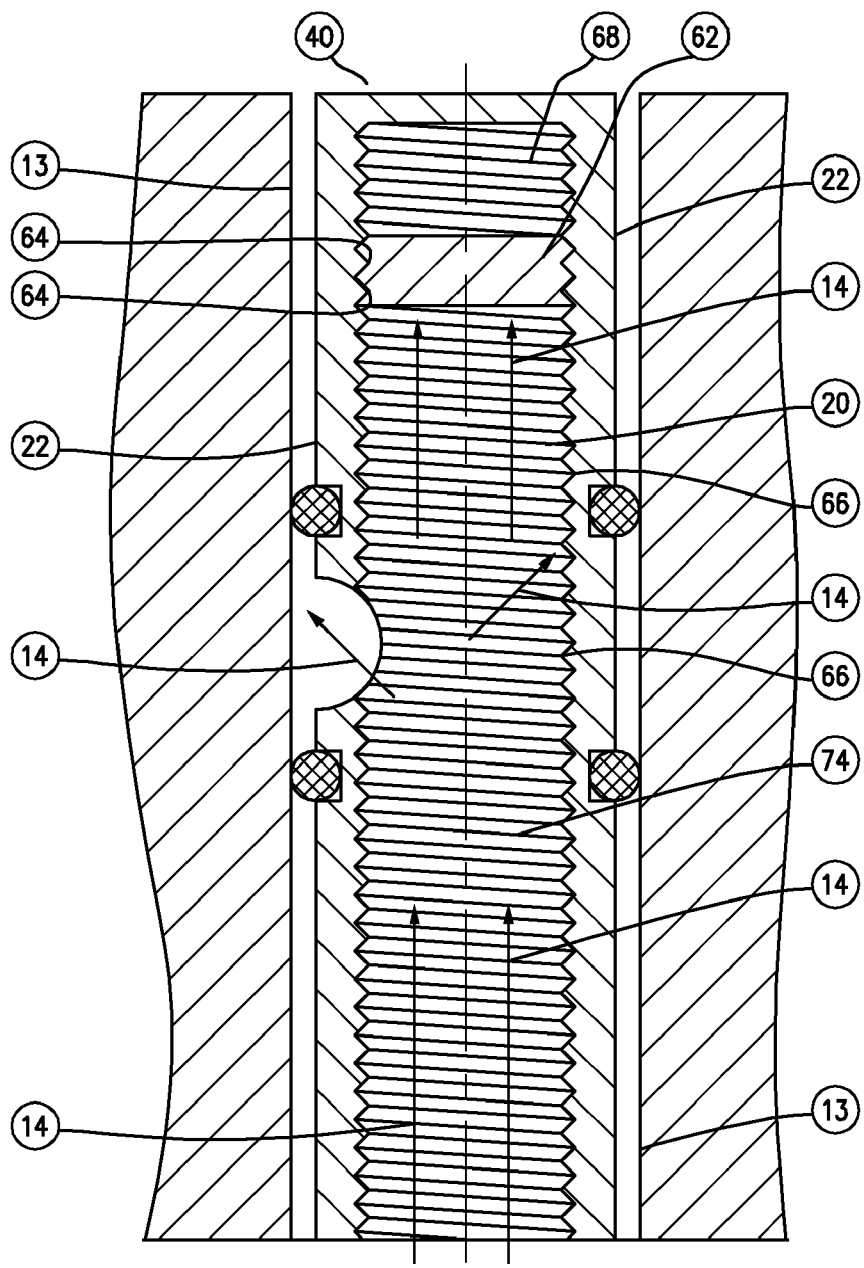
FIG. 1D is a perspective view of a valve assembly with ejector plug.
Figure 1C:
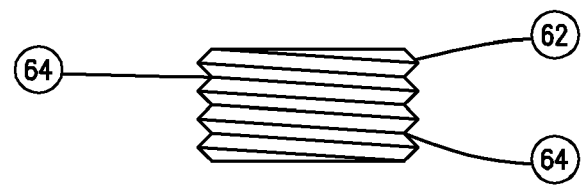
FIG. 1C is a perspective view of an ejector plug.

Looking now at FIG. 1C and FIG. 1D, we see that the ejector (16) may comprise means to vary the volume of the ejector interior (20) that may communicate with the pressurized medium (14). There we see an ejector plug (62) having threads (64) and an injector interior (20) having threads (66). Further, we note that the ejector plug threads (64) and the ejector interior threads (66) correspond so that the ejector plug (62) may be twisted into or out of the ejector interior (20) by turning and/or withdrawn from the ejector interior (20). Also, we see that, when advanced into the ejector interior (20), the ejector plug (62) divides the ejector interior (20) into an anterior portion (68) and a posterior portion (74) and will block the flow of pressurized medium (14) into the anterior portion (68). In such instance, we further see that the expansion of the ejector body (18) anterior of the ejector plug (62) will be diminished substantially. This will decrease substantially the friction between the ejector exterior surface (22) and passage wall (13).

Thus, by any or any combination of the above means, a valve assembly (40) may be contrived to have a pre-determined set pressure.

Looking now at FIG. 1B, we see that if the material comprising the ejector body (18) is sufficiently resilient, then the ejector body (18) may be tapered or otherwise appropriately configured so that the ejector (16) may be press fitted into the sleeve structure (10) passage (12). This allows the annular grooves (24) and O-rings (30) to be eliminated. In addition, looking at FIG. 1A, we see that alternatively by contriving the ejector exterior (22) so that it comprises annular ridges (52) of resilient material, the O-rings (30) and annular grooves (24) may be eliminated.

Figure 5A:
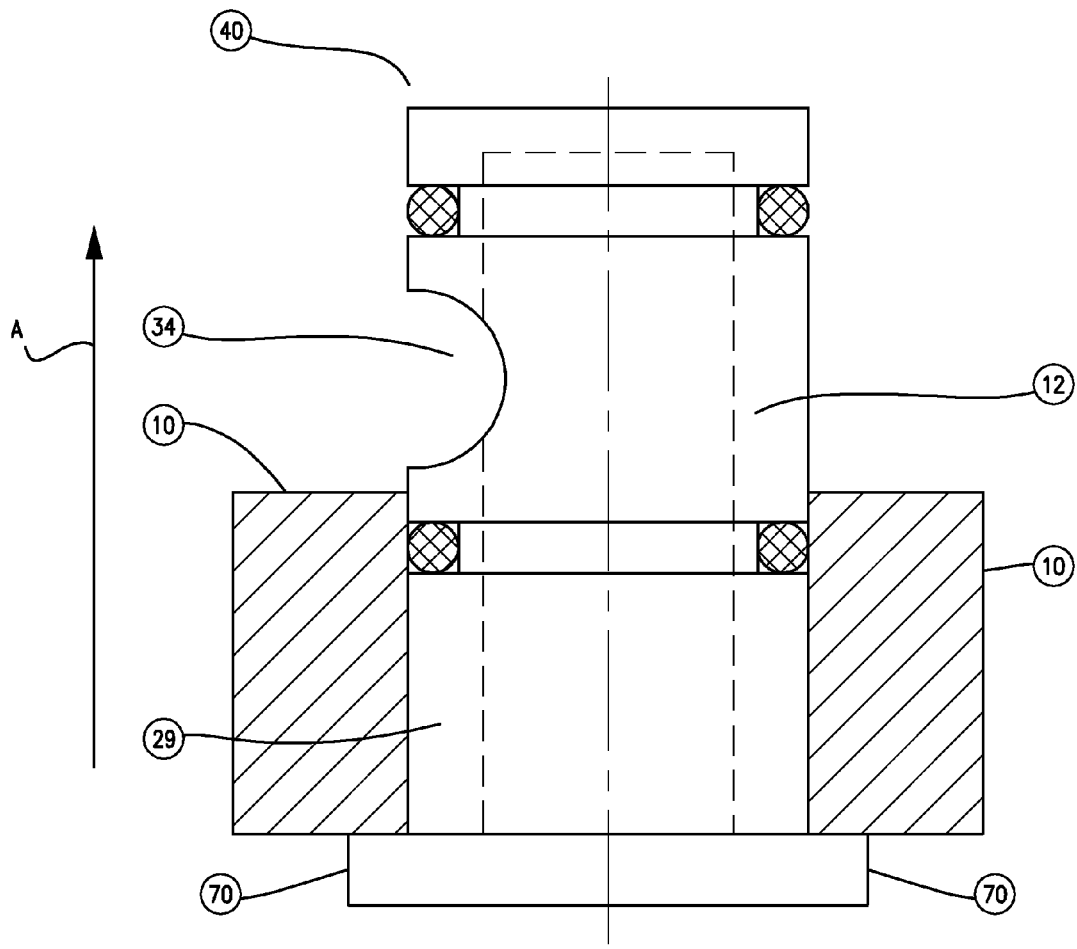
FIG. 5A is a perspective view of a valve assembly open with bottom flange.

Now, attention is invited to FIG. 5 and FIG. 5A where we see a valve assembly (40), closed FIG. 5 and open FIG. 5A, having an ejector (16) disposed within a passage (12) comprised by a sleeve structure (10). Also, we see that the posterior end (29) of the ejector comprises a bottom flange (70) which will limit the travel of the ejector (16) within the passage (12) when the ejector (16) is caused to move in direction A, depicted by arrow, according to previously described principles. Furthermore, we see that the ejector (16) is contrived so that once the outlet port (34) reaches not occluded position, travel of the ejector (16) through the passage (12) will be halted and the ejector (16) will not be expelled entirely from the passage (12).

Figure 5B:
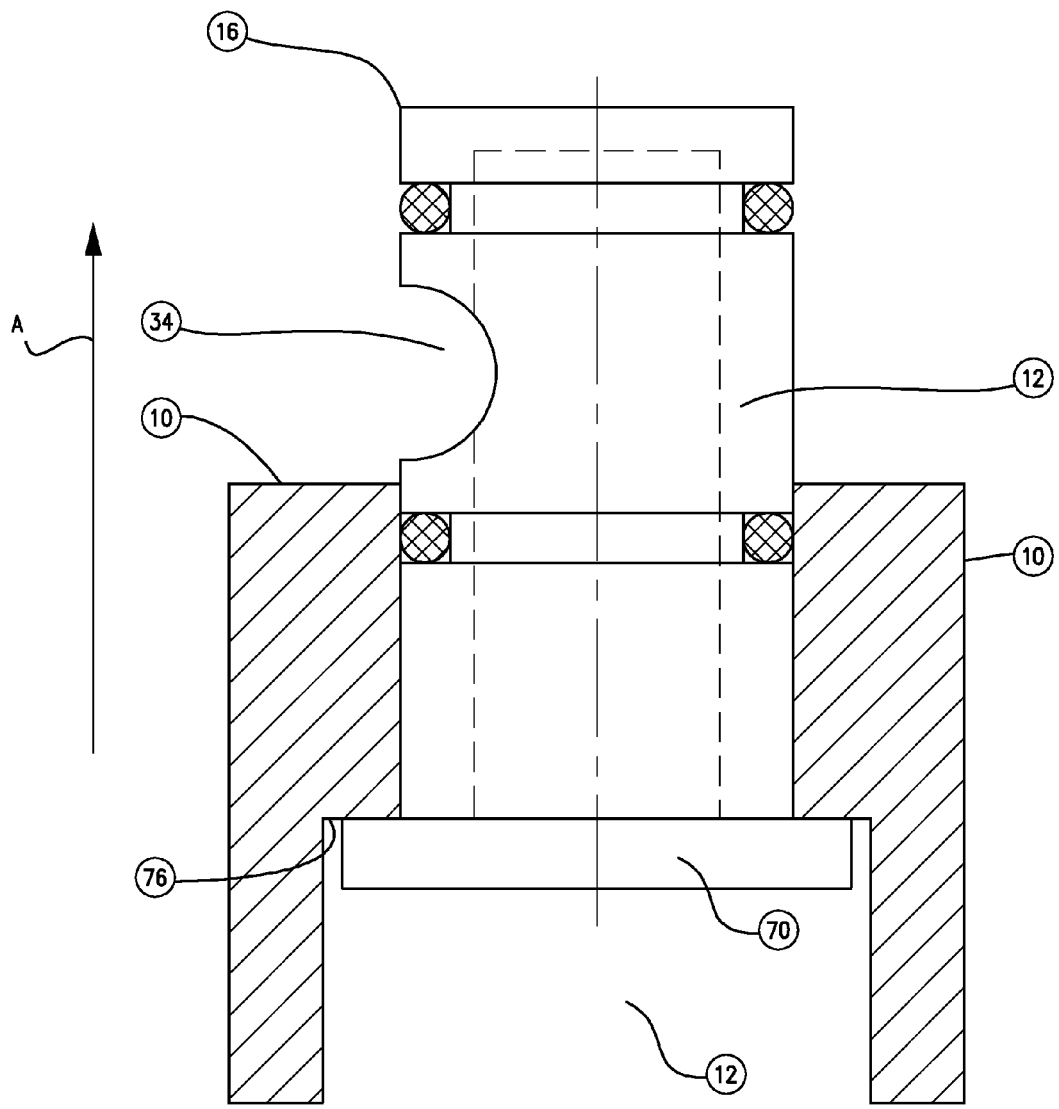
FIG. 5B is a perspective view of a valve assembly open with shoulder.

Alternatively, looking at FIG. 5B, we see that the passage (12) may have a plurality of portions having different diameters so as to comprise a shoulder (76) against which the bottom flange (70) may abut to limit the travel of the ejector (16) in the passage (12) so that the ejector (16) may not be expelled completely from the passage (12).

Figure 6:
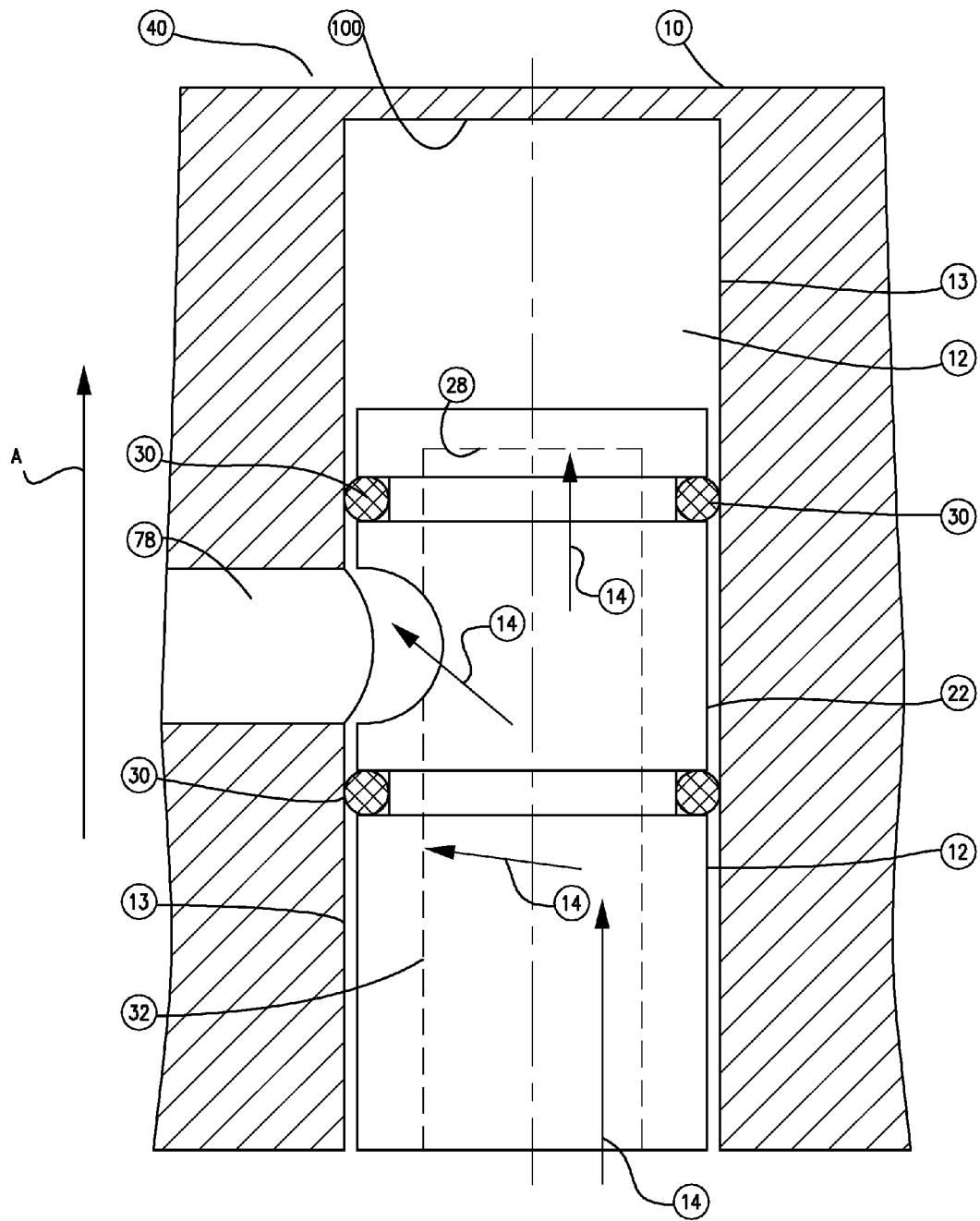
FIG. 6 is a perspective view of a valve assembly in check valve configuration.
Figure 6A:
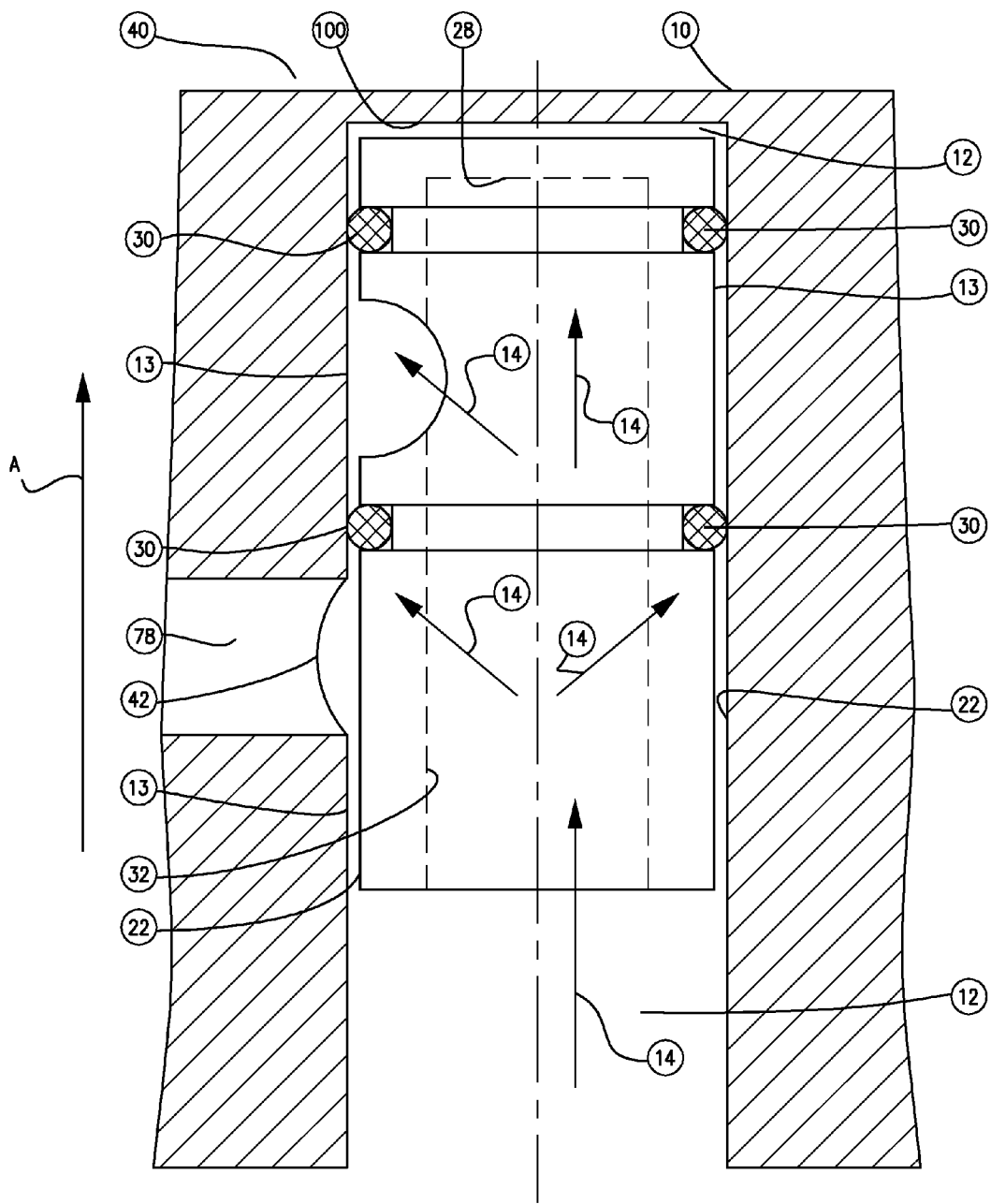
FIG. 6A is a perspective view of a valve assembly closed in check valve configuration.

Turning now to FIGS. 6 and 6A, we see that while embodiments of the instant art have depicted a pressure relief valve, by contriving the sleeve structure (10) and passage (12) so that an outlet conduit (78) communicates with the passage (12) and situating the ejector (16) in an initial position where the outlet port (34) is aligned with the outlet conduit (78), the initial disposition of the valve assembly (40) may be open rather than closed. Thus, when pressurized medium (14), acting upon the interior anterior end (28) of the ejector (16) becomes great enough to overcome the friction between the ejector exterior (22) and the passage wall (13), the ejector (16) will move within the passage (12), in direction A, depicted by arrow, to a point where the outlet port (34) will be occluded by the passage wall (13) and/or O-rings (30) and flow of medium under pressure (14) through the outlet conduit (78) will be shut off by blockage of the outlet port (34) by the ejector wall (42). Further, we see that the passage (12) may comprise a closed end (100). In this manner, the instant art may function as a check valve.

Figure 7:
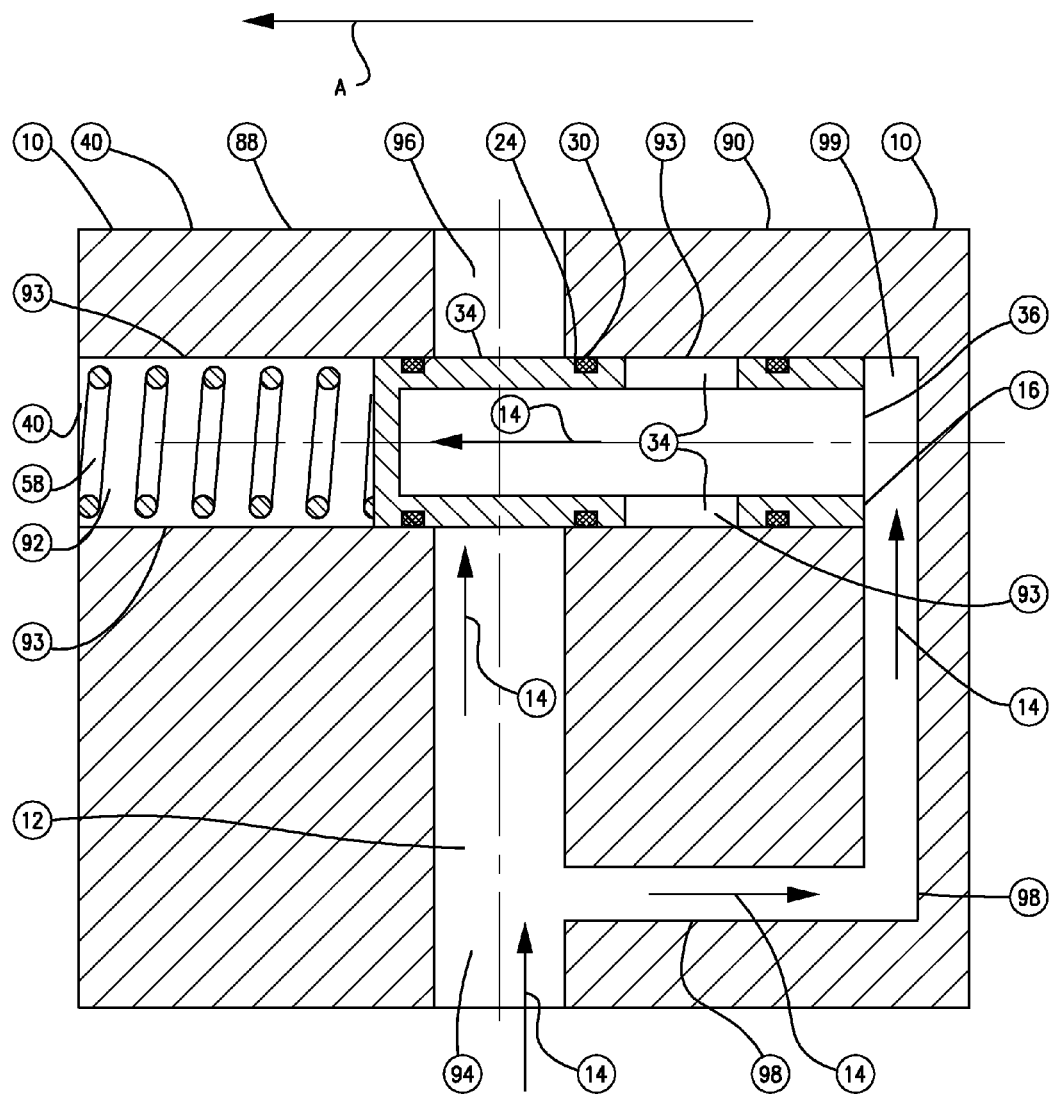
FIG. 7 is a perspective view of a valve assembly in pilot valve configuration.
Figure 7A:
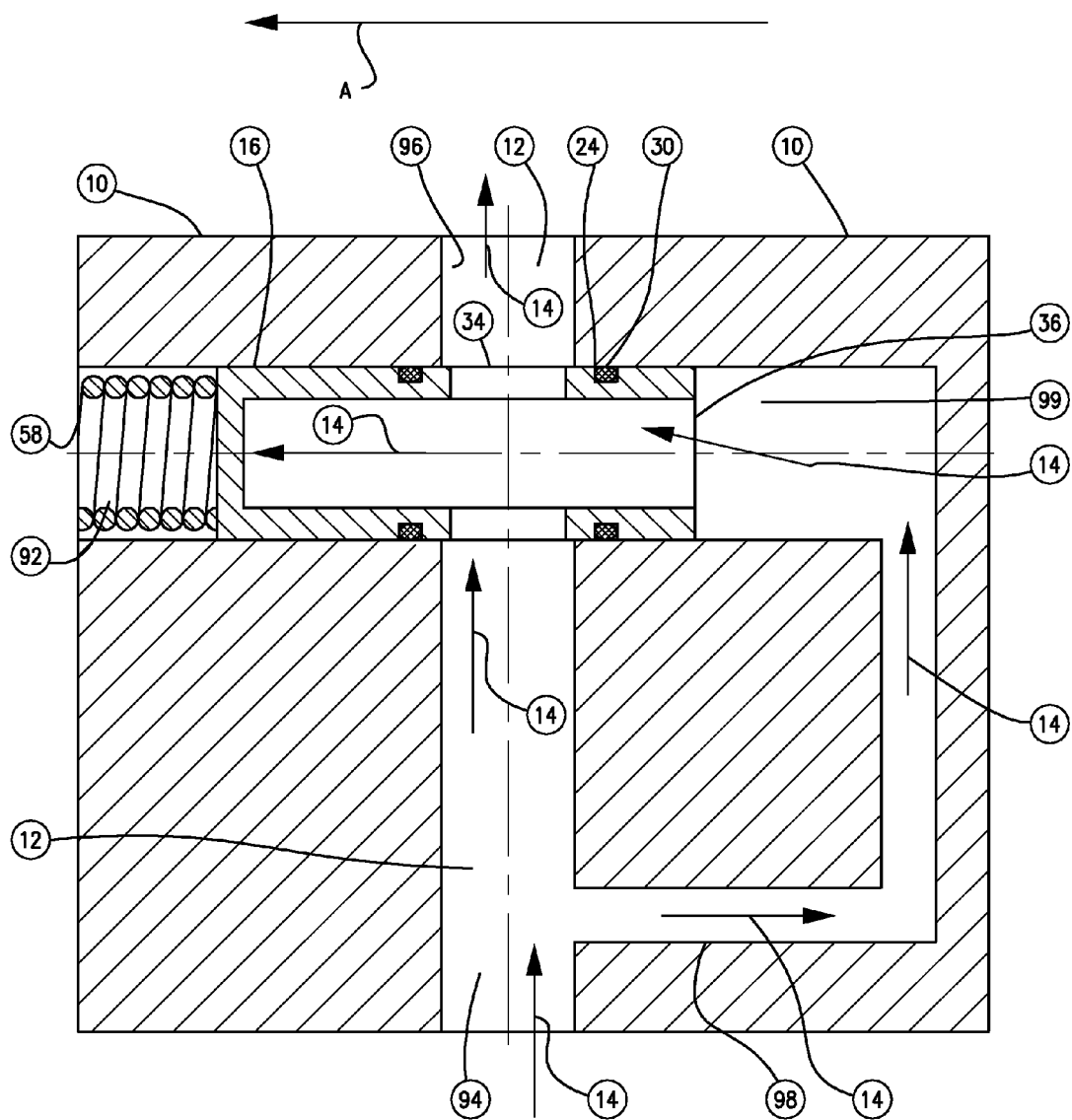
FIG. 7A is a perspective view of a pilot valve assembly open.

Turning now to FIG. 7, we see a sleeve structure (10) having a first side (88) and a second side (90) comprising a passage (12). In addition, we see that the first side (88) comprises a first cross channel (92) having walls (93) and that the second side (90) comprises a second cross channel (99) having walls (93). Further, the first cross channel (92) and second cross channel (99) are substantially coaxial and communicate with the passage (12). Also, we see an ejector (16), of the type previously described, disposed in the cross channels (92 and 99) so that the outlet port (34) is occluded by a cross channel wall (93) and the ejector (16) extends across the passage (12) blocking the passage (12) and thusly dividing the passage (12) into an upstream portion (94) and a downstream portion (96), so that flow of pressurized medium (14) is blocked in the passage (12) and medium (14) is restricted to the upstream portion (96) of the passage (12). In addition, we see a pilot channel (98) extending from the upstream portion (94) to the second side (90) cross channel (99) so that pressurized medium (14) from the upstream portion (94) may cause the ejector (16) to expand. When pressure in the upstream portion (94) reaches a predetermined level, the ejector (16) will be caused to move in direction A, indicated by arrow, according to previously described principles, in the cross channels (92 and 99) so that the outlet port (34) will be positioned in the passage (12) allowing medium (14) to travel to the downstream side (96) of the passage thusly releasing pressure.

Thus, the instant art may be contrived to function after the fashion of a pilot valve.

Turning again to FIG. 7, we see disposed in the first cross (92) channel a resilient resistance means (48), which in these descriptions is embodied as a spring (58), having an initial compressibility threshold not greater than the set pressure of the valve assembly (40). Thus, when the ejector (16) is forced into the first cross channel (92), the ejector (16) will compress the spring (58) and when the pressure of the medium (14) upstream is lowered sufficiently, the ejector (16) will contract to decrease the friction between the ejector exterior side (22) and the cross channel walls (93) whereupon the spring (58) will expand and force the ejector (16) from first cross channel (92) to second cross channel (99) so that the outlet port (34) of the injector (16) is again occluded thus resetting the valve assembly (40) automatically.

Turning again to FIG. 7, we see that though the pilot valve assembly (40) depicted functions as a pressure relief valve, by repositioning the outlet port (34) and annular groove (24) and O-ring (30) on the ejector (16), as indicated by dotted lines, so that the outlet port (34) of the ejector (16) is initially disposed in the passage (12) so that medium (14) may flow from upstream (94) of the ejector (16) to downstream (96) of the ejector (16) and so that when the ejector (16) is caused to move, as previously described, the outlet port (34) will be extended into the first cross channel (92) thus blocking the passage (12), the pilot valve assembly (40) depicted may be contrived to function after the fashion of a check valve.

Figures 8, 8A:
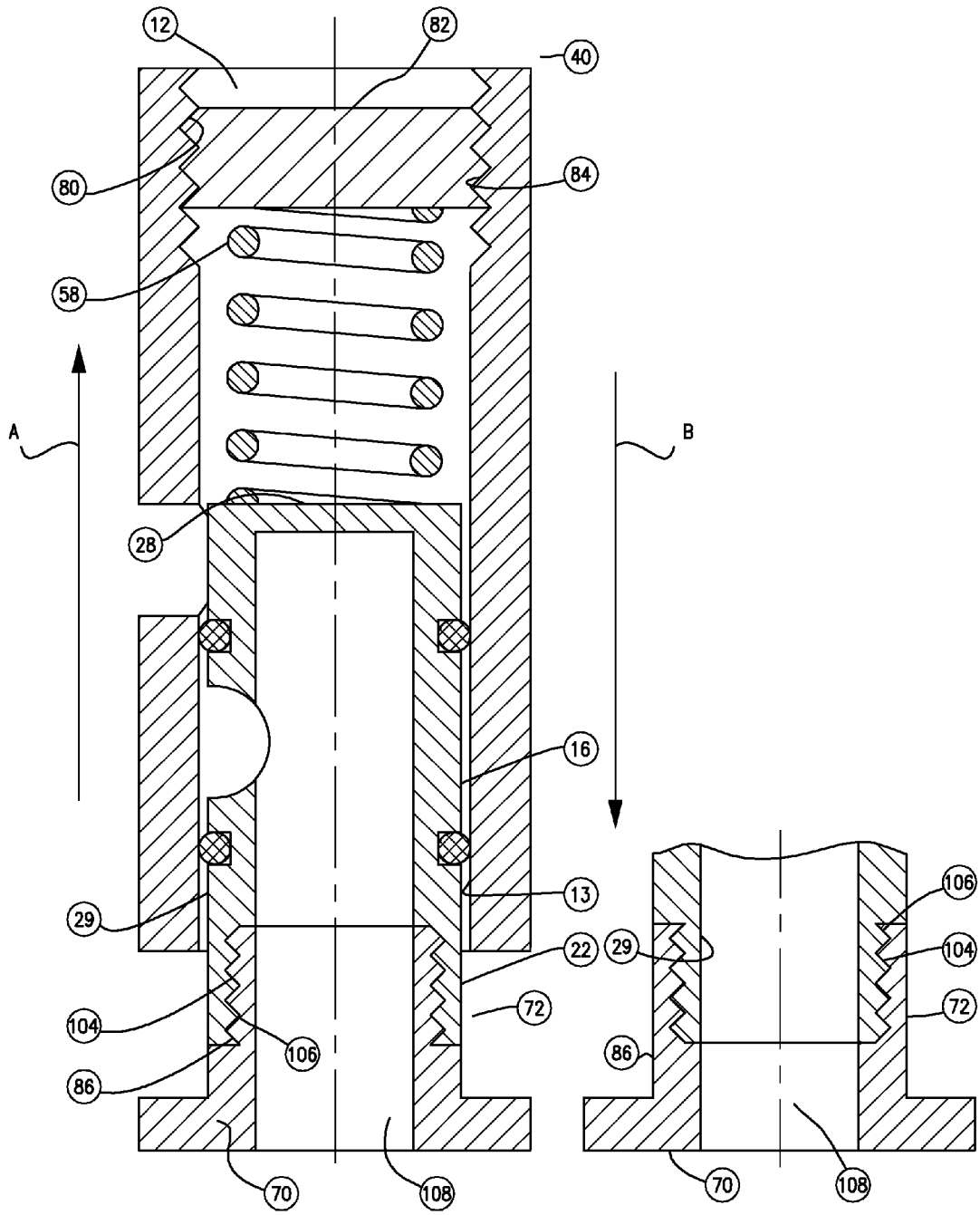
FIG. 8 is a perspective view of a valve assembly with reset spring.
FIG. 8A is a perspective view of a bottom flange assembly.
Figure 9:
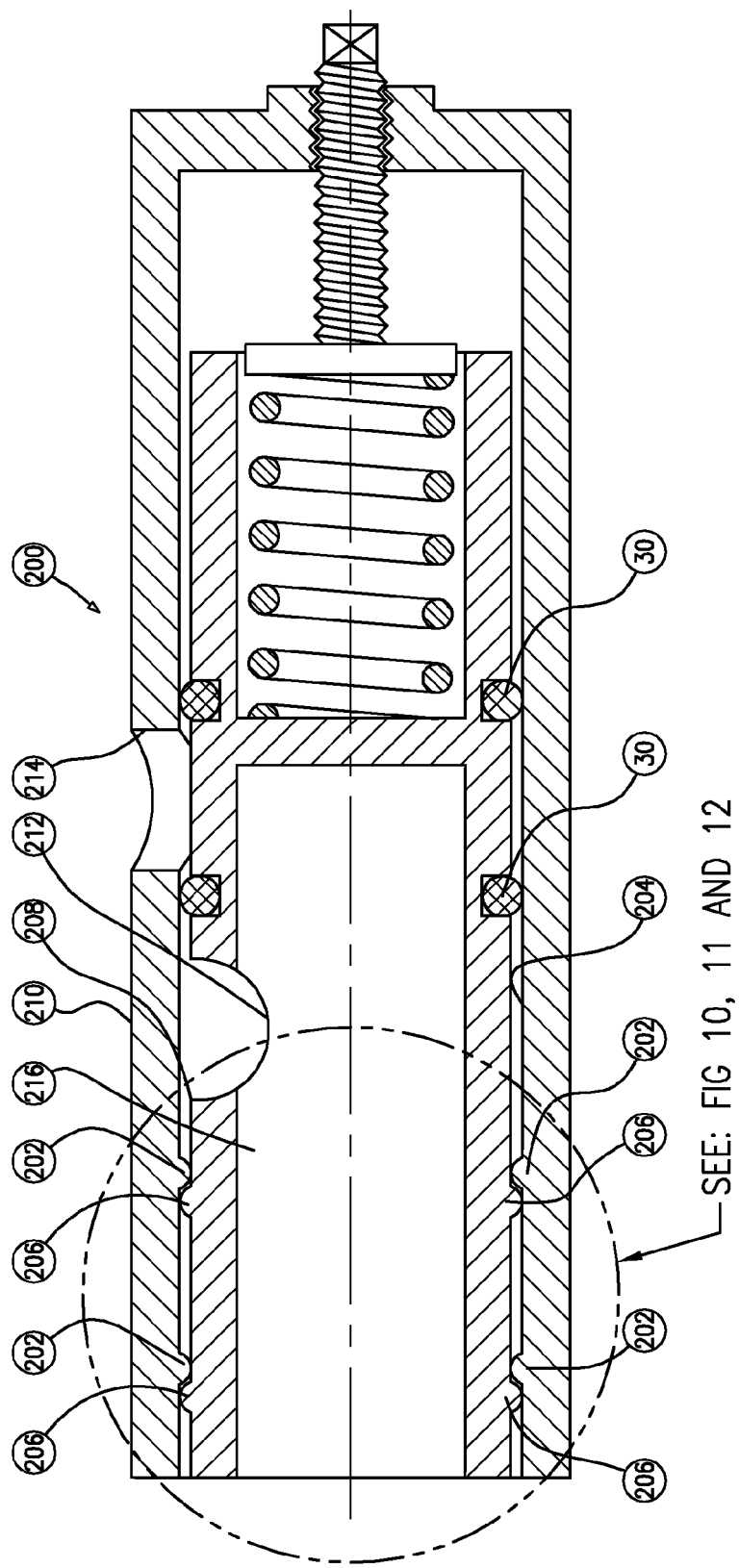
FIG. 9 is a cut away side view of a valve constructed in accordance with a preferred embodiment of the present invention.

Turning now to FIG. 8, we see that the valve assembly (40) may comprise a passage (12) having threads (80) and a passage plug (82) having threads (84). The passage threads (82) and the passage plug threads (84) correspond so that the passage plug (82) may communicate with the passage (12)

and be movable, removable, and or adjustable within the passage (12) by rotation and/or counter-rotation.

Looking again at FIG. 8, we see that a spring (58) is disposed in the passage (12) and is seated against the closed end (100) of the passage (12), said closed end (100) being comprised by the passage plug (82), and the exterior anterior end (28) of the ejector (16). The spring (58) has a compressibility threshold substantially equal to or less than the force required to overcome the friction between the ejector exterior (22) and the passage wall (13). Thus, the ejector (16) will compress the spring (58) as it travels in direction A, depicted by arrow, as activated by the sufficient pressure of the medium (14), according to dynamics previously described. Further, we may readily appreciate that when the pressure of the medium (14), is released, the ejector body (18) will contract reducing the friction between the ejector exterior (22) and the passage wall (13) to a level less than that needed to overcome the spring (58) so that the spring (58) will move the ejector in direction B. In this manner, the spring (58) will cause the valve assembly (40) to automatically be reset.

Looking further at FIG. 8 and at FIG. 8A, we see that the posterior end (29) of the ejector (16) may comprise threads (104) with the threads (104) being internal as in FIG. 8 or external as in FIG. 8A. In addition, we see a bottom flange assembly (72) comprising a body portion (86) having threads (106) and a bottom flange (70), with the threads (106) either external as in FIG. 8 or internal as in FIG. 8A, which correspond with the ejector posterior end threads (104) so that the flange assembly (72) may removably communicate with the ejector (16) as in FIG. 8 and FIG. 8A.

Further, looking again at FIG. 8 and FIG. 8A, we see that the bottom flange assembly (72) comprises a passage (108) so that the ejector assembly (72) will not prevent the entry of pressurized medium (14) into the ejector interior (20). Thus the bottom flange assembly (72) may function to limit travel of the ejector (16) in the manner previously described.

Furthermore, looking again at FIG. 8 we may readily appreciate that the passage plug (82) and/or the external exterior end (26) of the ejector (16) may comprise sundry configurations well known in the art to facilitate the seating of the spring (58). We may also readily appreciate that the passage closed end (100) need not be movable, removable, and/or adjustable but may be integral to the sleeve structure (10), as in FIG. 6 and FIG. 6A, and that the spring (58) may seat against the closed end (100). The closed end (100) may comprise any of sundry configurations well known in the art to facilitate the seating of the spring (58).

Referring now to FIGS. 9, 10, 11, and 12, the present invention is a fast opening, stand alone valve (200) for providing pressure relief for a vessel or system in which it is to be installed. The valve (200) is formed by an ejector (216) and the sleeve structure (210). The valve (200) opens when the pressure exerted internally by pressurization of the ejector (216) overcomes the friction created between the ejector (216) and the sleeve structure (210). Once the pressure exerted internally by pressurization of the ejector (216) overcomes the friction created between the ejector (216) and the sleeve structure (210), the valve (200) will open quickly, i.e. opening within 2 and 3 milliseconds.

Figure 10:
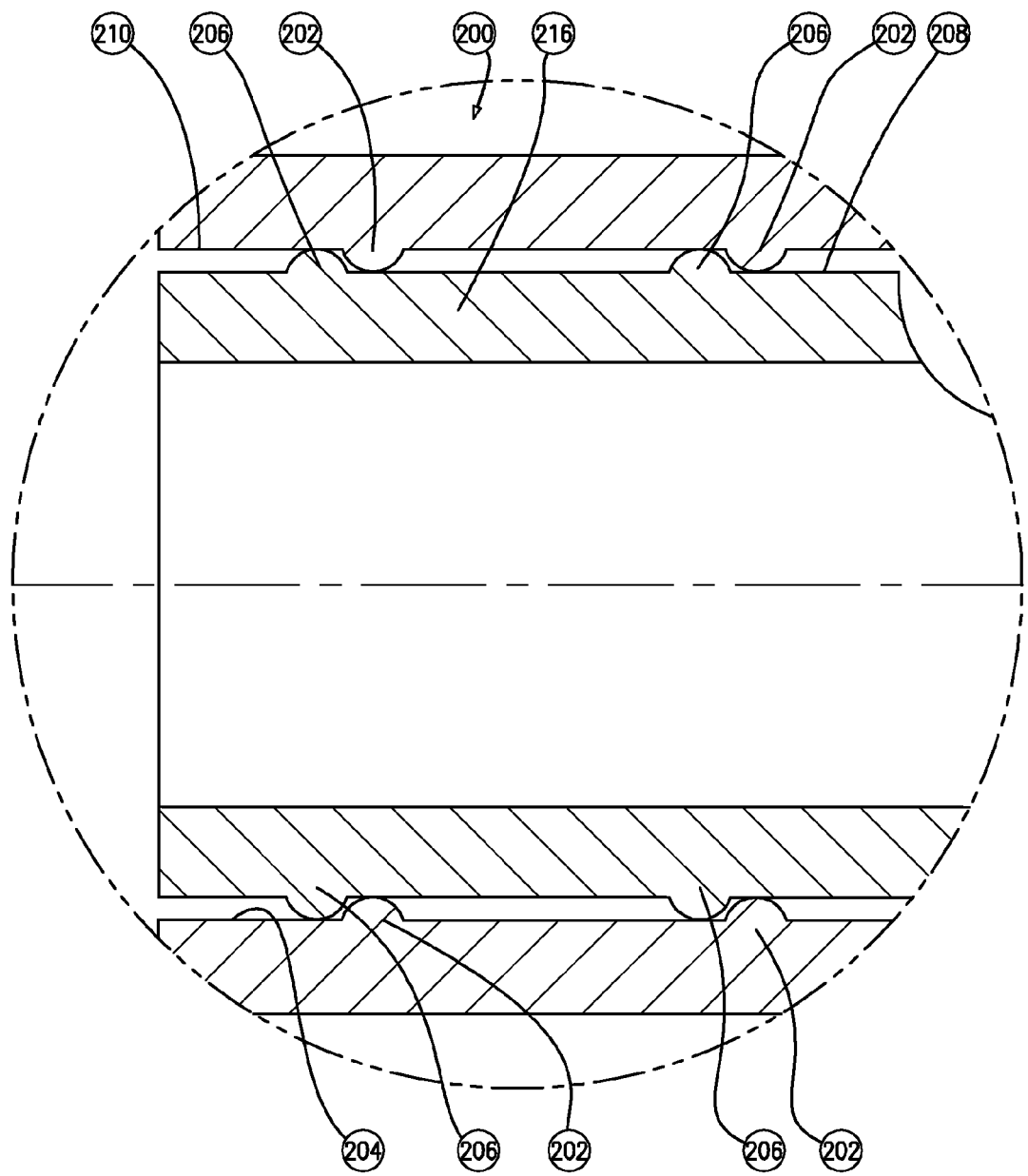
FIG. 10 is an enlarged view of the area within circle 10 of FIG. 9, showing the buckling glands and the staging glands when the valve is closed and before it begins to open.

The ejector (216) is preferably constructed of a material that will expand outward slightly upon pressurization, thereby increasing the friction created between the sleeve structure (210) and the ejector (216), and more specifically, increasing the friction between inwardly extending sleeve rings or staging glands (202) provided on an interior surface (204) of the sleeve structure (210) as an integral part of the sleeve structure (210) and outwardly extending ejector rings or buckling glands (206) that are provided on the exterior surface (208) of the ejector (216) as an integral part of the ejector (216). The ejector rings or buckling glands (206) move outward with the outward expansion of the ejector (216), as shown in FIG. 10.

Figure 11:
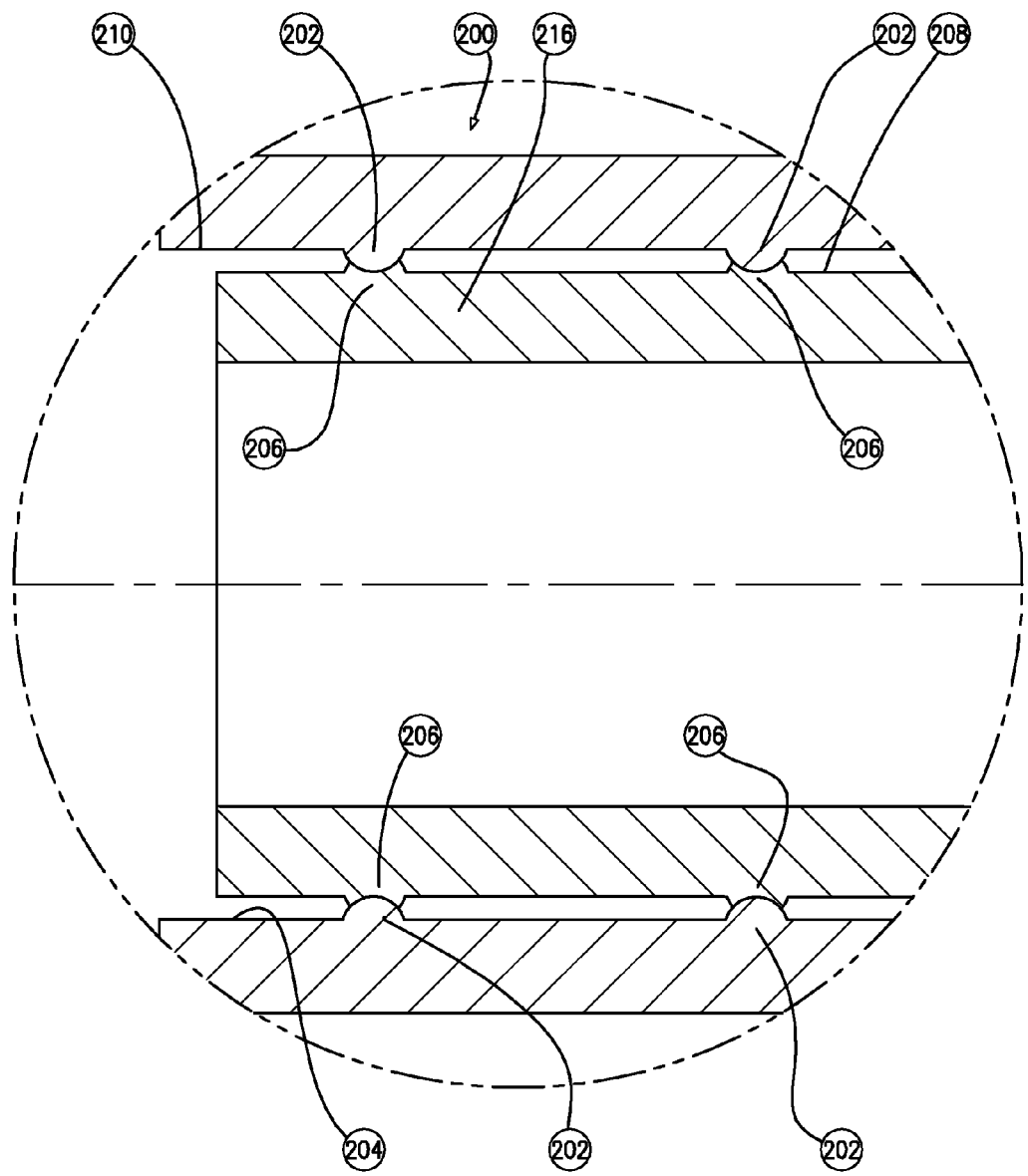
FIG. 11 is an enlarged view of the area of the valve shown in FIG. 10 showing the valve as the buckling glands are deforming to allow the valve to open.
Figure 12:
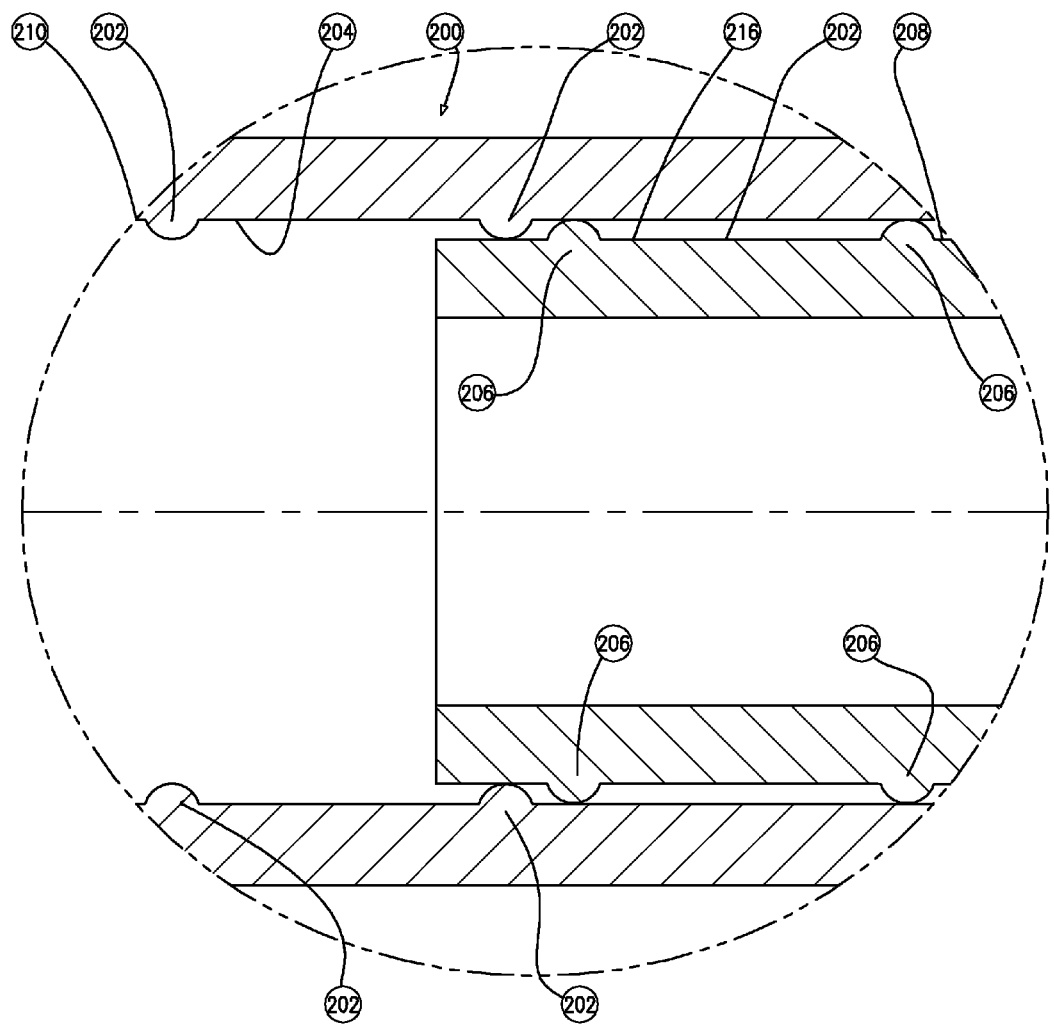
FIG. 12 is an enlarged view of the area of the valve shown in FIGS. 10 and 11 showing the valve as the buckling glands have passed by the staging glands and the valve is opening.

Also, the ejector (216) is preferably constructed of a material that will also deform or buckle so that its ejector rings or buckling rings (206) can deform slightly. When sufficient pressure is exerted internally on the ejector (216), the ejector rings or buckling rings (206) will deform slightly, as shown in FIG. 11, thereby releasing their grip on the sleeve rings or staging glands (202) and moving past them. Once the ejector rings or buckling rings (206) move past the sleeve rings or staging glands (202), the pressurized ejector (216) quickly moves to its open position. In the open position, the ejector discharge port (212) is aligned with the valve discharge port (214), thereby releasing the internal pressure on the ejector (216). Suitable materials from which the ejector (216) is to be constructed include Teflon®, stainless steel and Inconel®. The pressures exerted on the ejector range from 1 psi to 7,000 psi.

STOP As is obvious from the preceding description of the ejector valve (200), the present invention can be used as a method for limiting or relieving pressure on a vessel by attaching the stand alone pressure relief valve (200) to a pressurizable vessel so that the valve (200) is in a closed position, then holding the valve (200) in the closed position by engagement of the inwardly extending staging glands (202) by the buckling glands (206), and finally exerting increasing pressure on the vessel and the attached valve (200) until the pressure pushing the ejector (216) to move longitudinally in the sleeve (210) overcomes the frictional resistance to longitudinal movement of the ejector (216) within the sleeve structure (210). When the pressure pushing the ejector (216) to move longitudinally in the sleeve (210) overcomes the frictional resistance to longitudinal movement, the buckling glands (206) deform inwardly so that the buckling glands (206) pass by the staging glands (202) thereby causing the valve (200) to move to its open position and relieving the pressure on the vessel. As pressure is exerted on the valve (200) and before the pressure exerted on the valve (200) is sufficient to open the valve (200), the wall of the hollow ejector (216) is expanded outward diametrically to more tightly engage the sleeve structure (210) as pressure is exerted on the interior of the ejector (216), thereby increasing the frictional resistance to longitudinal movement of the ejector (216).

Once the valve (200) has been opened and pressure released from the vessel, the valve (200) is reset to its closed position by sliding the ejector (216) within the sleeve structure (210) so that the buckling glands (206) pass by the staging glands (202). Once reset, the valve (200) is ready to once again be used to protect the vessel from over pressurization.

In order to change the pressure at which the valve (200) opens, one only need change the height and width of the valve (200) since it is the dimensions of the valve (200) in conjunction with the material from which the valve (200) is constructed that determine its opening pressure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for limiting pressure in a vessel employing a stand alone pressure relief valve attached to the vessel comprising:
   attaching a stand alone pressure relief valve to a pressurizable vessel so that the valve is in a closed position,
   holding the valve in the closed position by engagement of inwardly extending staging glands provided on an interior surface of a sleeve structure of the valve which are engaged by buckling glands that are provided on an exterior surface of a slightly deformable hollow ejector of the valve where the ejector is configured to slidably fit into a passage defined by the sleeve structure of the relief valve and to move between a closed position and an open position where pressure is released from the vessel, and
   exerting increasing pressure on the vessel and the attached valve until the pressure pushing the ejector to move longitudinally in the sleeve overcomes the frictional resistance to longitudinal movement of the ejector within the sleeve structure by deforming the buckling glands inwardly so that the buckling glands pass by the staging glands thereby causing the valve to move to its open position and relieving the pressure on the vessel.

2. A method according to claim 1 wherein a wall of the hollow ejector expands outward diametrically to more tightly engage the sleeve structure when pressure is exerted on the interior of the ejector thereby increasing the frictional resistance to longitudinal movement of the ejector.

3. A method according to claim 1 further comprising:
   resetting the valve to a closed position by sliding the ejector within the sleeve structure so that the buckling glands pass by the staging glands.

4. A method according to claim 3 wherein the steps are repeated.

5. A method according to claim 3 wherein the opening pressure of the valve can be changed by altering the dimensions of the valve.

6. A method according to claim 3 wherein the opening pressure of the valve can be changed by altering the material from which the valve is constructed.

* * * * *